United States Patent
Sato et al.

(10) Patent No.: US 9,070,041 B2
(45) Date of Patent: Jun. 30, 2015

(54) IMAGE PROCESSING APPARATUS AND IMAGE PROCESSING METHOD WITH CALCULATION OF VARIANCE FOR COMPOSITED PARTIAL FEATURES

(75) Inventors: Hiroshi Sato, Kawasaki (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/914,439

(22) Filed: Oct. 28, 2010

(65) Prior Publication Data
US 2011/0103695 A1  May 5, 2011

(30) Foreign Application Priority Data
Nov. 4, 2009  (JP) ................................. 2009-253521

(51) Int. Cl.
G06K 9/46 (2006.01)
G06K 9/00 (2006.01)
G06K 9/62 (2006.01)

(52) U.S. Cl.
CPC .......... G06K 9/4604 (2013.01); G06K 9/00248 (2013.01); G06K 9/6256 (2013.01)

(58) Field of Classification Search
None
See application file for complete search history.

(56) References Cited

U.S. PATENT DOCUMENTS

| | | | |
|---|---|---|---|
| 5,430,809 A * | 7/1995 | Tomitaka | 382/173 |
| 5,751,959 A | 5/1998 | Sato et al. | |
| 5,819,048 A | 10/1998 | Okazaki et al. | |
| 5,909,543 A | 6/1999 | Tanaka et al. | |
| 6,463,176 B1 | 10/2002 | Matsugu et al. | |
| 6,507,358 B1 | 1/2003 | Mori et al. | |
| 6,704,042 B2 | 3/2004 | Matsui et al. | |
| 7,054,850 B2 | 5/2006 | Matsugu | |
| 7,532,745 B2 | 5/2009 | Inoue | |
| 7,639,282 B2 | 12/2009 | Kaneda et al. | |
| 2003/0161504 A1 | 8/2003 | Inoue | |

(Continued)

FOREIGN PATENT DOCUMENTS

| | | | |
|---|---|---|---|
| JP | 03-252782 A | 11/1991 | |
| JP | 07-249124 A | 9/1995 | |

(Continued)

OTHER PUBLICATIONS

Viola & Jones (2001) "Rapid Object Detection using a Boosted Cascade of Simple Features," Computer Vision and Pattern Recognition, pp. 1-9.

(Continued)

*Primary Examiner* — Sumati Lefkowitz
*Assistant Examiner* — Ryan P Potts
(74) *Attorney, Agent, or Firm* — Fitzpatrick, Cella, Harper & Scinto

(57) ABSTRACT

Corresponding partial features are extracted from an input pattern and a registration pattern as a preregistered pattern. A plurality of combinations of the partial features are generated as composited partial features. One of registration pattern classes to which the input pattern corresponds is identified by using the plurality of composited partial features. The identification is performed based on the result of evaluation of the partial features which belong to the composited partial feature and correspond to each other in the input pattern and the registration pattern. In the evaluation, the composited partial feature is evaluated based on the measurement result of the quantity of partial features meeting a predetermined criterion.

13 Claims, 11 Drawing Sheets

(56) References Cited

U.S. PATENT DOCUMENTS

| | | | |
|---|---|---|---|
| 2006/0008150 A1* | 1/2006 | Zhao et al. | 382/190 |
| 2006/0193520 A1 | 8/2006 | Mita et al. | |
| 2006/0204103 A1* | 9/2006 | Mita et al. | 382/190 |
| 2007/0025722 A1 | 2/2007 | Matsugu et al. | |
| 2007/0098231 A1 | 5/2007 | Minato | |
| 2008/0118156 A1* | 5/2008 | Okada | 382/195 |
| 2008/0130962 A1* | 6/2008 | Lee et al. | 382/118 |
| 2008/0181508 A1 | 7/2008 | Kaneda et al. | |
| 2008/0232696 A1* | 9/2008 | Kasahara et al. | 382/224 |
| 2009/0003709 A1 | 1/2009 | Kaneda et al. | |
| 2009/0060290 A1* | 3/2009 | Sabe et al. | 382/118 |
| 2009/0169101 A1 | 7/2009 | Mitarai et al. | |
| 2009/0190834 A1 | 7/2009 | Inoue | |
| 2010/0118163 A1 | 5/2010 | Matsugu et al. | |

FOREIGN PATENT DOCUMENTS

| | | | | |
|---|---|---|---|---|
| JP | 3078166 | | 6/2000 | |
| JP | 2002-008032 | | 1/2002 | |
| JP | 2003-242486 | | 8/2003 | |
| JP | 2003242486 A | * | 8/2003 | ............... G06T 1/00 |
| JP | 2003-323622 | | 11/2003 | |
| JP | 2004-157967 A | | 6/2004 | |
| JP | 2005-267406 A | | 9/2005 | |
| JP | 2006-268825 | | 10/2006 | |
| JP | 2007-128262 A | | 5/2007 | |
| JP | 2008-148161 A | | 6/2008 | |

OTHER PUBLICATIONS

Baback Moghaddam et al., "Beyond Eigenfaces: Probabilistic Matching for Face Recognition" (M.I.T. Media Laboratory Perceptual Computing Section Technical Report No. 443).

Baback Moghaddam et al., "Probabilistic Visual Learning for Object Representation" (IEEE Transactions on Pattern Analysis and Machine Intelligence, vol. 19, No. 7, Jul. 1997), pp. 696-710.

* cited by examiner

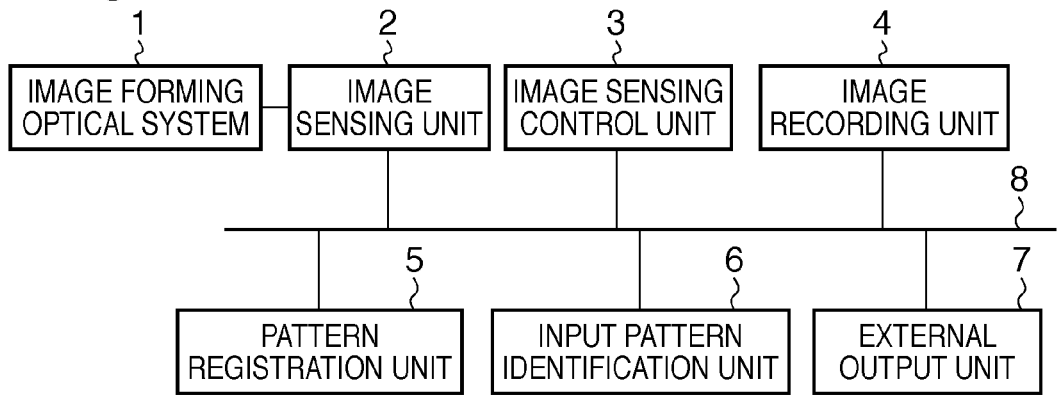
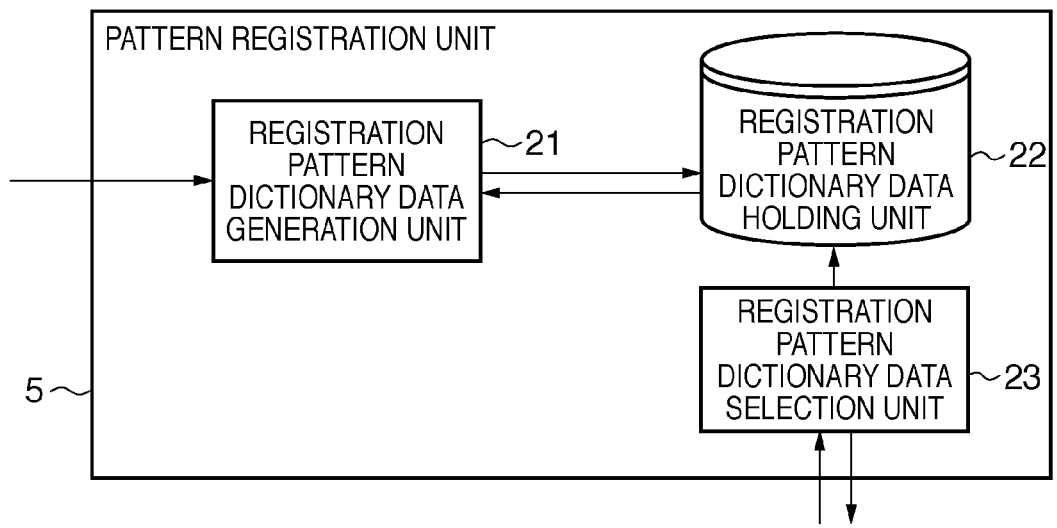
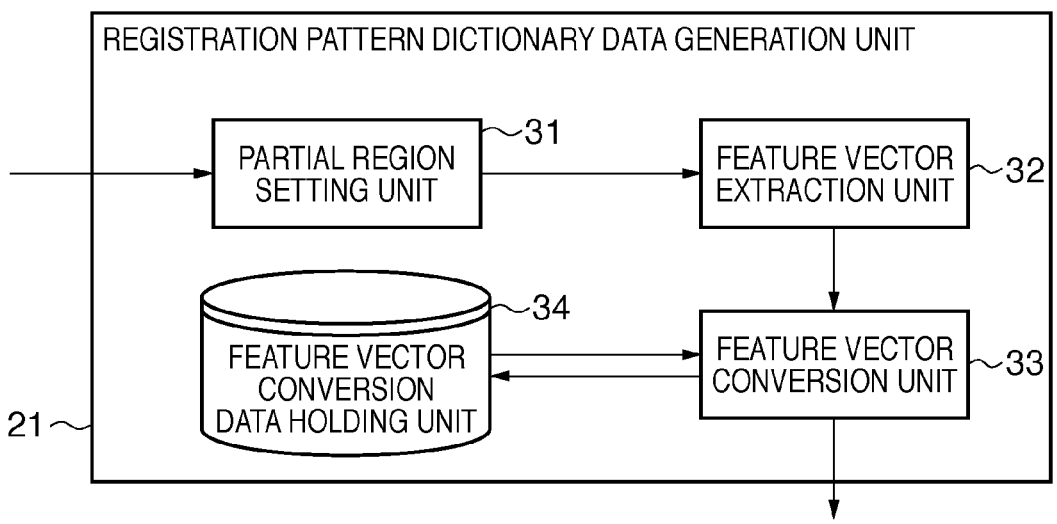

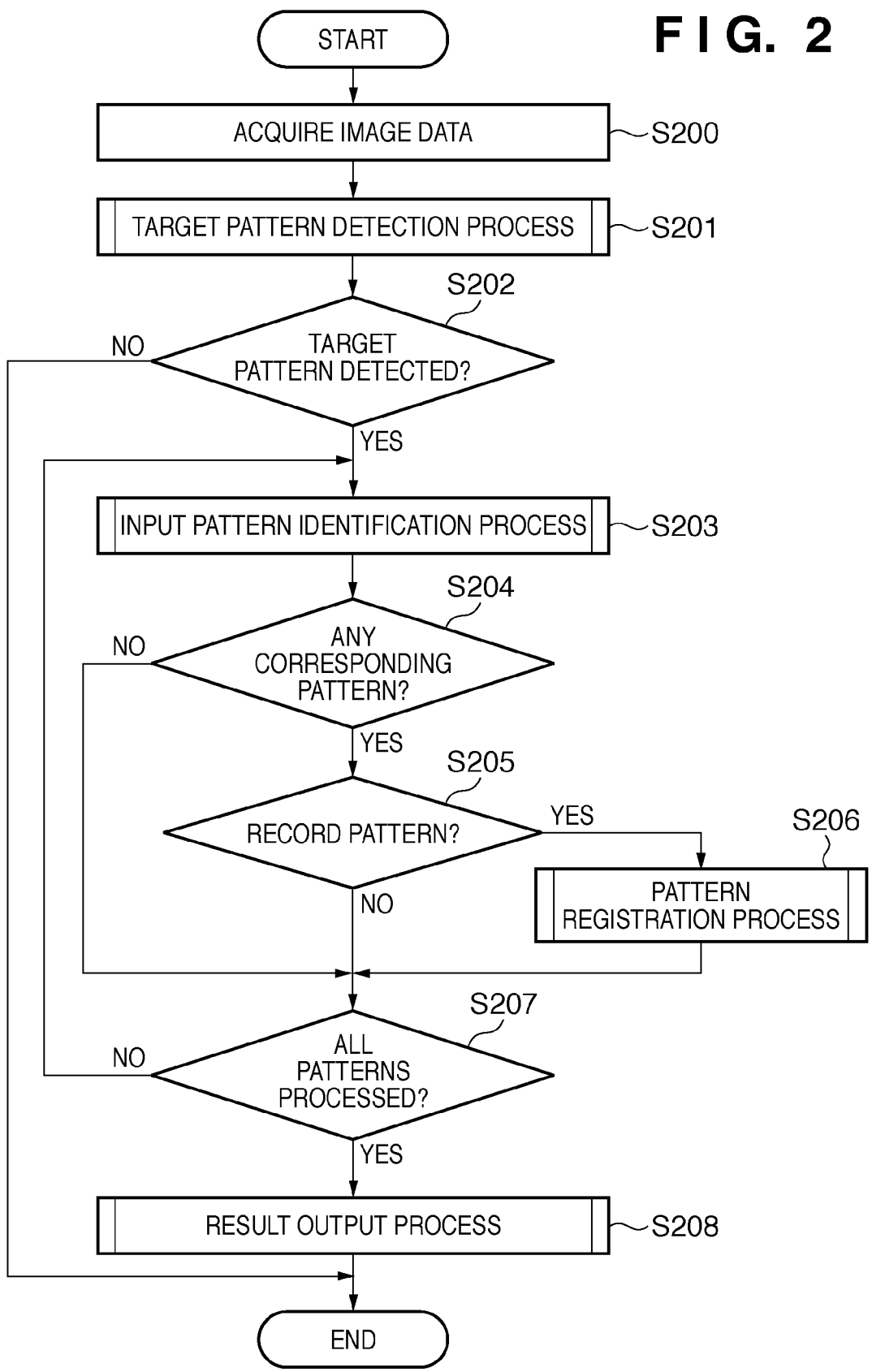

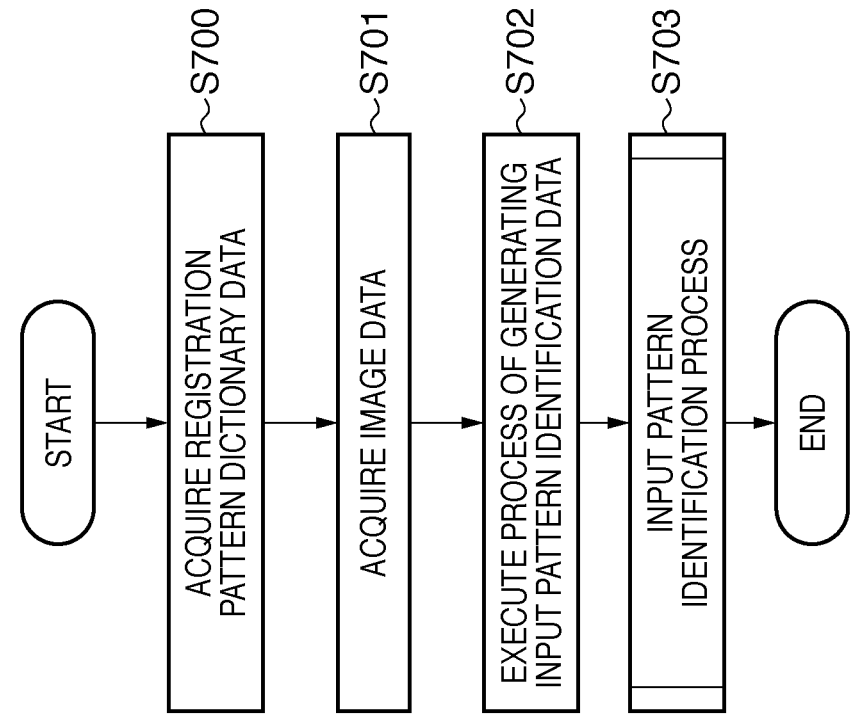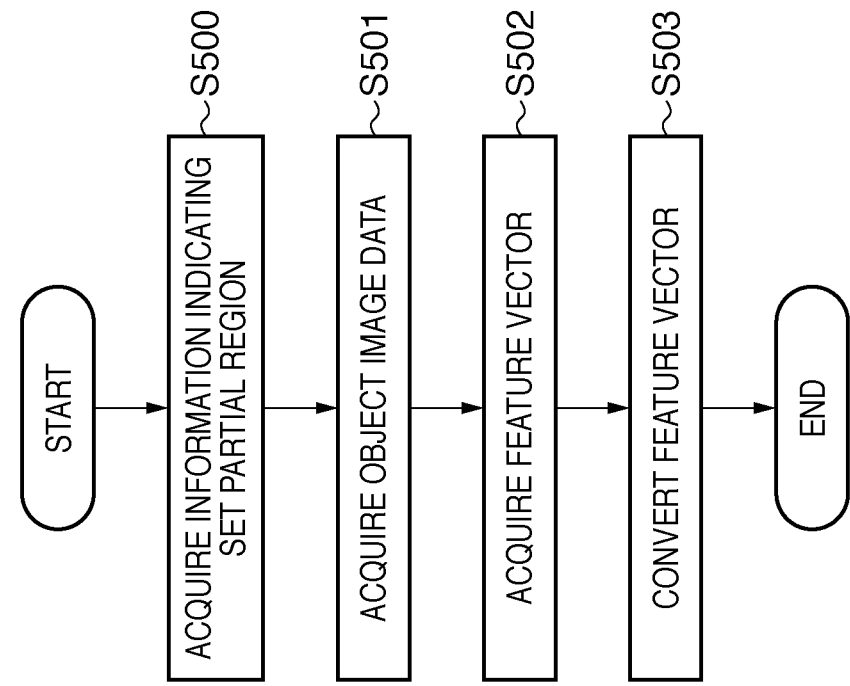

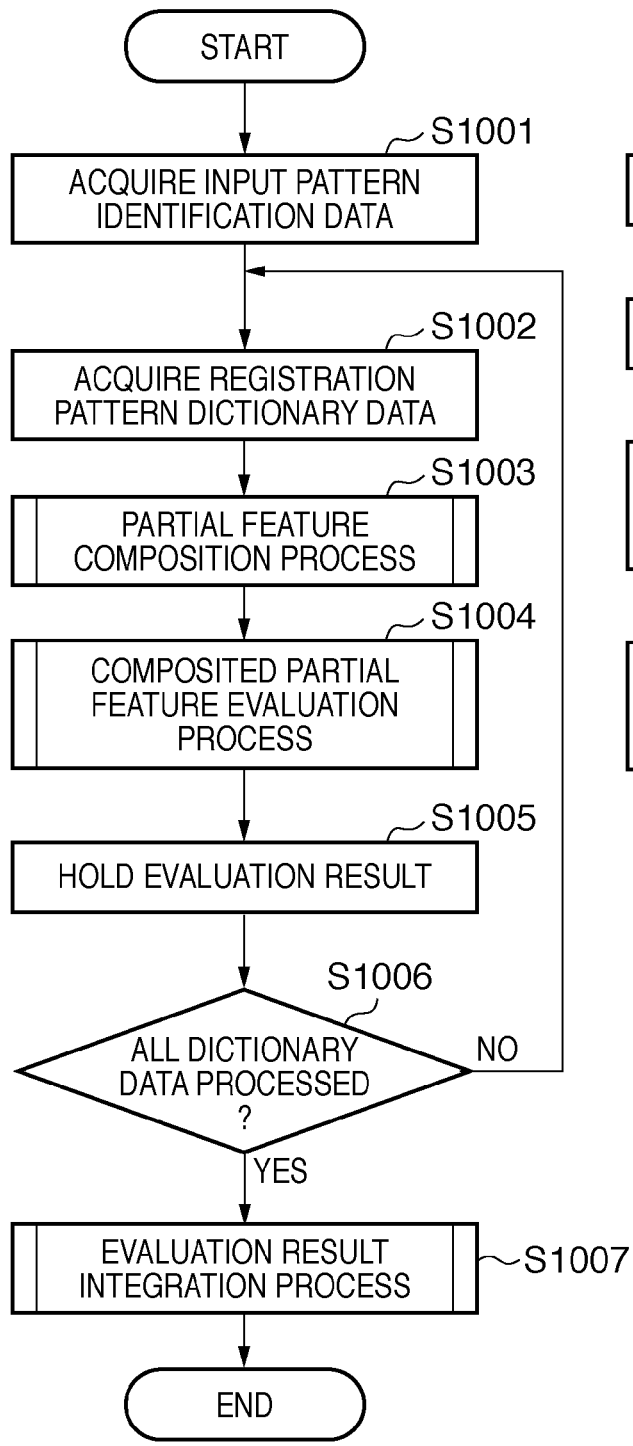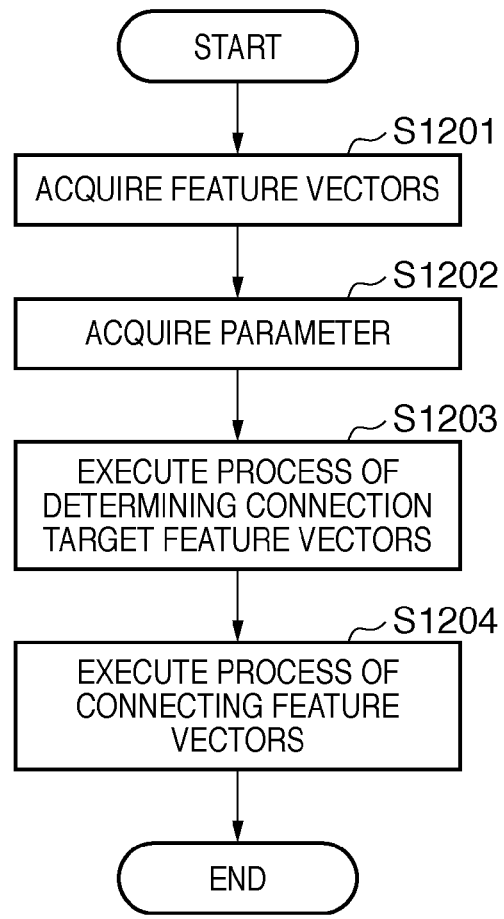
FIG. 5A
FIG. 5B

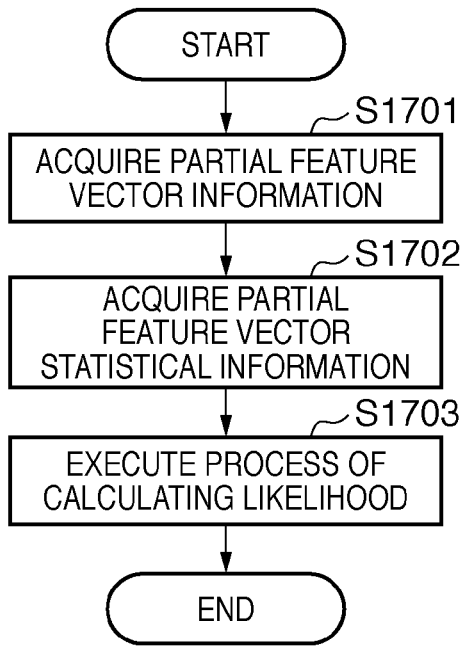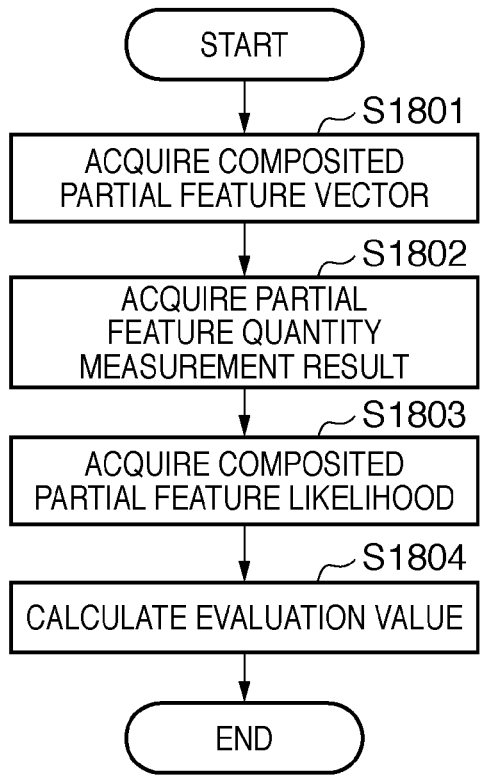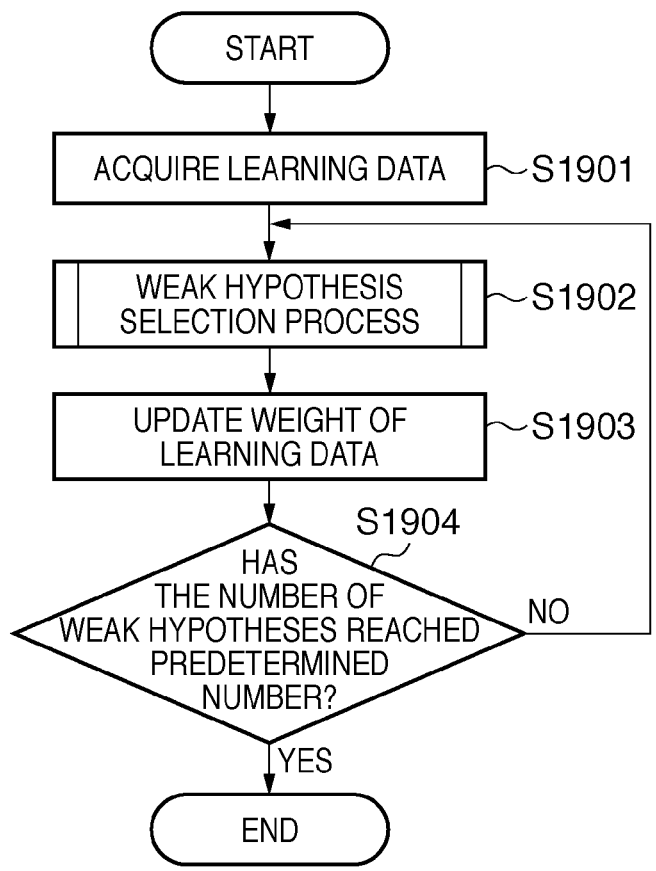

IMAGE PROCESSING APPARATUS AND IMAGE PROCESSING METHOD WITH CALCULATION OF VARIANCE FOR COMPOSITED PARTIAL FEATURES

BACKGROUND OF THE INVENTION

1. Field of the Invention

The present invention relates to a pattern identification technique.

2. Description of the Related Art

A face identification technique of identifying the face of an individual is an example of identification techniques in pattern recognition, typically, a technique of identifying an object in image data with an object in another image. In this specification, pattern identification refers to determination of a difference between individual patterns (e.g., a difference between persons as individuals). On the other hand, pattern detection refers to determination of the category of individuals without distinguishing between them (e.g., detection of faces without distinguishing between individuals).

An example of the face identification technique is a method as disclosed in Baback Moghaddam et al., "Beyond Eigenfaces: Probabilistic Matching for Face Recognition" (M.I.T. Media Laboratory Perceptual Computing Section Technical Report No. 443), and "Probabilistic Visual Learning for Object Representation" (IEEE Transactions on Pattern Analysis and Machine Intelligence, Vol. 19, No. 7, July 1997). This is an algorithm capable of performing face registration and additional learning in real time by replacing an individual identification problem using a face with a 2-class identification problem of a feature class called a differential face.

For example, in face identification using a generally well-known support vector machine (SVM), n SVM discriminators for discriminating between a registered person's face and other faces are required to identify the faces of n persons. SVM learning is necessary to register a person's face. SVM learning requires a person's face to be registered and a large amount of face data of already registered persons and other persons, and requires a very long calculation time. Therefore, a general approach is to perform calculations beforehand. However, the method of non-patent reference 1 can make additional learning practically unnecessary by replacing the individual identification problem with the following 2-class identification problem.

Intra-personal class: a class of variation features such as an illumination variation, expression, and direction between images of the same person Extra-personal class: a class of variation features between images of different persons Assuming that the distributions of the two classes described above are constant regardless of any specific individual, discriminators are designed by resolving the individual face identification problem into the above-mentioned, 2-class identification problem. A large number of images are prepared, and learning is performed for a discriminator for discriminating between the class of variation features of the same person and the class of variation features between different persons. A new registrant need only hold a face image (or the result of extraction of a necessary feature). When performing discrimination, a differential feature is extracted from two images, and the discriminator determines whether the two images show the same person or different persons. This obviates the need for learning of the SVM or the like when registering the face of an individual, and makes it possible to perform the registration in real time.

In an apparatus and method of identifying a pattern (an object in an image, more specifically, a person's face) as described above, variations between a registration pattern and authentication pattern deteriorate identification performance. This is the variation of an object (person's face) to be identified. Practical examples are variations caused by the illumination condition, the direction, the posture, hiding by another object, and the expression. If the variation as described above increases, the identification performance largely deteriorates.

To solve this problem, patent reference 1 (Japanese Patent Laid-Open No. 2003-323622) ensures the robustness against variations by performing pattern matching a plurality of number of times for each partial region, removing outliers from the results, and integrating the degrees of matching of the partial regions.

Also, patent reference 2 (Japanese Patent Laid-Open No. 2006-268825) performs determination by quantizing the feature amount of each partial region, dividing the feature amounts into several subgroups, calculating the weighted sum of the quantized feature amounts in each subgroup as a new partial feature amount, and integrating the new partial feature amounts. This makes it possible to perform determination by paying attention to matching between the plurality of partial regions.

Unfortunately, room for improvement in performance presumably remains if outliers are simply removed with respect to the similarity of a plurality of partial regions and the weighted average is simply calculated. For example, if there is an error in the setting of the plurality of partial regions described above, the possibility that the error can sufficiently be corrected by the above-mentioned processing alone is probably low. In particular, if the similarity of a partial region having a heavy weight is affected by a variation, the weighted average of the similarities between partial regions increases the influence on the identification performance. Therefore, this processing is not satisfactorily robust against variations.

To maintain the identification performance even in an environment in which variations are large like those of human faces and the image sensing conditions are various, it is perhaps effective to incorporate processing which, if there is an error in the setting of the plurality of partial regions described above, can absorb the error to some extent.

In applications to digital cameras and Web cameras, the identification performance desirably does not deteriorate even when the variations in image sensing conditions and patterns (for example, size, direction, and expression) are large. It is very important to design a method that performs identification from the similarity of each partial region and does not deteriorate the identification performance even if there is an error to some extent in the setting of partial regions.

SUMMARY OF THE INVENTION

The present invention has been made in consideration of the above situation, and provides a high-accuracy pattern identification technique that is robust against variations such as a pattern to be identified and its peripheral environment.

According to the first aspect of the present invention, an image processing apparatus comprising: an extraction unit that extracts corresponding partial features from an input pattern and a registration pattern as a preregistered pattern; a composition unit that generates a plurality of combinations of the partial features as composited partial features; a measurement unit that measures a quantity of the partial features which belong to the composited partial feature, correspond to each other in the input pattern and the registration pattern, and satisfy a predetermined criterion; an evaluation unit that evaluates the partial features based on the measurement result from the measurement unit; and an identification unit that identifies, among classes to which respective registration patterns belong, a class corresponding to the input pattern based on the evaluation result from the evaluation unit.

According to the second aspect of the present invention, an image processing apparatus comprising: an extraction unit that extracts corresponding partial features from an input pattern and a registration pattern as a preregistered pattern; a composition unit that generates a plurality of combinations of the partial features as composited partial features; a calculation unit that calculates a likelihood of the composited partial feature, by referring, as a reference, a statistical amount between the partial features which belong to the composited partial feature and correspond to each other in the input pattern and the registration pattern; an evaluation unit which evaluates the partial features based on the calculation result by the calculation unit; and an identification unit that identifies, among classes to which respective registration patterns belong, a class corresponding to the input pattern based on the evaluation result from the evaluation unit.

According to the third aspect of the present invention, an image processing method comprising: an extraction step of extracting corresponding partial features from an input pattern and a registration pattern as a preregistered pattern; a composition step of generating a plurality of combinations of the partial features as composited partial features; a measurement step of measuring a quantity of the partial features which belong to the composited partial feature, correspond to each other in the input pattern and the registration pattern, and satisfy a predetermined criterion; an evaluation step of evaluating the partial features based on the measurement result from the measurement step; and an identification step of identifying, among classes to which respective registration patterns belong, a class corresponding to the input pattern based on the evaluation result from the evaluation step.

According to the fourth aspect of the present invention, an image processing method comprising: an extraction step of extracting corresponding partial features from an input pattern and a registration pattern as a preregistered pattern; a composition step of generating a plurality of combinations of the partial features as composited partial features; a calculation step of calculating a likelihood of the composited partial feature, by referring, as a reference, a statistical amount between the partial features which belong to the composited partial feature and correspond to each other in the input pattern and the registration pattern; an evaluation step of evaluating the partial features based on the calculation result in the calculation step; and an identification step of identifying, among classes to which respective registration patterns belong, a class corresponding to the input pattern based on the evaluation result from the evaluation step.

Further features of the present invention will become apparent from the following description of exemplary embodiments with reference to the attached drawings.

BRIEF DESCRIPTION OF THE DRAWINGS

FIG. 1A is a block diagram showing a functional configuration example of a pattern identification apparatus 100;

FIG. 1B is a block diagram showing a functional configuration example of a pattern registration unit 5;

FIG. 1C is a block diagram showing a functional configuration example of a registration pattern dictionary data generation unit 21;

FIG. 2 is a flowchart of overall processing performed by the pattern identification apparatus 100;

FIG. 3A is a flowchart of processing performed by a feature vector extraction unit 32 and feature vector conversion unit 33;

FIG. 3B is a flowchart of processing performed by an input pattern identification unit 6;

FIG. 5A is a flowchart of processing performed by the input pattern identification operation unit 43;

FIG. 5B is a flowchart of processing performed by the partial feature composition unit 63;

FIG. 8A is a flowchart of processing performed by the composited partial feature likelihood calculation unit 84;

FIG. 8B is a flowchart of processing performed by a composited partial feature evaluation value calculation unit 85;

FIG. 8C is a flowchart as an example of a partial region learning process;

DESCRIPTION OF THE EMBODIMENTS

Figure 4A:
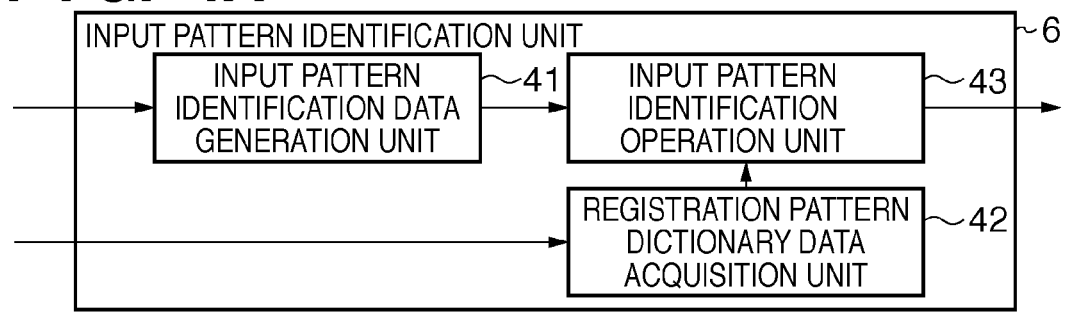
FIG. 4A is a block diagram showing a functional configuration example of the input pattern identification unit 6.

Embodiments of the present invention will be explained below with reference to the accompanying drawings. Note that each embodiment to be explained below is an example when the present invention is practically carried out, and is one practical example of the arrangement described in the scope of claims.

First Embodiment

<Functional Configuration Example of Pattern Identification Apparatus 100>

First, a functional configuration example of a pattern identification apparatus 100 as an image processing apparatus according to this embodiment will be explained below with reference to FIG. 1A. Note that in FIG. 1A, each of an image sensing control unit 3, pattern registration unit 5, and input pattern identification unit 6 is a dedicated circuit (ASIC) or a processor (for example, a reconfigurable processor, DSP, or CPU) in this embodiment. However, each unit need not always be implemented as a dedicated circuit, and may be installed as a computer program to be executed in a single dedicated circuit and a general-purpose circuit (a CPU for a PC).

In this case, the computer program is stored in a computer-readable storage medium such as a RAM or ROM and executed by the CPU, thereby executing various processes to be performed by the image processing apparatus to be explained below.

An image forming optical system 1 includes an optical lens having a zooming mechanism, and can also include driving mechanisms for the pan-axis and tilt-axis directions. An image sensing unit 2 includes a video sensor that converts external light input via the image forming optical system 1 into an electrical signal corresponding to the light amount, and outputs the electrical signal. The image sensing unit 2 is controlled by a sensor driving circuit (not shown). When receiving a read control signal from this sensor driving circuit, the image sensing unit 2 outputs the converted electrical signal (video signal), for example, a signal obtained by sub-sampling and block read, as image data.

The image sensing control unit 3 controls the timing of image sensing based on operation instructions (for example, field angle adjustment instruction and shutter pressing) from an operator of the apparatus, and instructions from the pattern registration unit 5 and input pattern identification unit 6.

An image recording unit 4 includes a semiconductor memory. The image recording unit 4 temporarily holds image data output from the image sensing unit 2, and transfers the image data in accordance with requests from the pattern registration unit 5 and input pattern identification unit 6.

The pattern registration unit 5 acquires the image data held in the image recording unit 4, extracts information of an object as an identification target from the acquired image data, and records and holds the information. The pattern registration unit 5 will be explained in detail later.

The input pattern identification unit 6 acquires the image data held in the image recording unit 4, and identifies a pattern, more typically, an object in the acquired image data by using the image data and the information held in the pattern registration unit 5. The input pattern identification unit 6 will be explained in detail later.

An external output unit 7 is typically a monitor such as a CRT or TFT liquid crystal. The external output unit 7 displays an image based on the image data acquired from the image sensing unit 2 or image recording unit 4, and superposes, on this image, the information extracted and identified by the pattern registration unit 5 or input pattern identification unit 6. Note that the external output unit 7 need not be a monitor, and can also be, for example, an interface for connecting to an external device. In this case, the external output unit 7 can transmit, to the external device, various kinds of data (image data, and information extracted and identified by the pattern registration unit 5 or input pattern identification unit 6) processed in this apparatus.

The image sensing unit 2, image sensing control unit 3, image recording unit 4, pattern registration unit 5, input pattern identification unit 6, and external output unit 7 are connected to a connection bus 8, and can exchange information with each other via the connection bus 8.

<Overall Processing Performed by Pattern Identification Apparatus 100>

Overall processing performed by the pattern identification apparatus 100, that is, a process of identifying a pattern in image data obtained by image sensing will be explained below with reference to FIG. 2. Note that the identification target pattern is a person's face in the following explanation, but the following processing is similarly applicable even when the identification target pattern is anything.

First, in step S200, the pattern registration unit 5 acquires image data recorded in the image recording unit 4 via the image forming optical system 1 and image sensing unit 2. Then, in step S201, the pattern registration unit 5 executes a process of detecting a human face from the acquired image data. Any well-known technique can be used as a method of detecting a human face from the image data. For example, it is possible to use a technique disclosed in "Japanese Patent No. 3078166" or "Japanese Patent Laid-Open No. 2002-8032".

If the pattern registration unit 5 detects one or more human faces, the process advances to step S203 via step S202. If the pattern registration unit 5 does not detect any human face, this process is terminated via step S202.

In step S203, the input pattern identification unit 6 executes a process of identifying the human face detected by the pattern registration unit 5 by using information pertaining to the human face. Details of the process in step S203 will be described later.

Subsequently, in step S204, the input pattern identification unit 6 determines whether the face identified in step S203 corresponds to any face identified in the past. If it is determined that the face identified in step S203 corresponds to a face identified in the past, the process advances to step S205; if not, the process advances to step S207.

In step S205, the input pattern identification unit 6 determines whether to record the information (pertaining the face detected in step S201) used for the identification in step S203, in a memory such as the image recording unit 4. Whether to record the information can also be preset, or designated by the user by operating an external interface or GUI.

Either way, if the information (pertaining to the face detected in step S201) used for the identification in step S203 is to be recorded in the memory such as the image recording unit 4, the process advances to step S206; if not, the process advances to step S207.

In step S206, the pattern registration unit 5 records the information (pertaining to the face detected in step S201) used for the identification in step S203, in the memory such as the image recording unit 4.

If all the faces detected by the pattern registration unit 5 have undergone the above processing, the process advances to step S208 via step S207. If there is an unprocessed face, the process returns to step S203 via step S207.

In step S208, the external output unit 7 displays an image based on the image data acquired from the image sensing unit 2 or image recording unit 4, and superposes, on this image, the information extracted and identified by the pattern registration unit 5 or input pattern identification unit 6.

<Pattern Registration Unit 5>

The pattern registration unit 5 will be explained below with reference to FIG. 1B. A registration pattern dictionary data generation unit 21 generates registration pattern dictionary data necessary to identify the individual of a pattern from image data acquired from the image recording unit 4. For example, when determining the 2-class problem of intra-class and extra-class as disclosed in non-patent reference 1, the dictionary data is typically a person's face image. It is also possible to normalize the size, the direction (in-plane rotational direction), and the like of person's face image data detected by the face detection process, and store the normalized data in a registration pattern dictionary data holding unit 22.

Note that the dictionary data amount can be reduced by storing only data necessary for identification, instead of the image data itself, in the registration pattern dictionary data holding unit 22. When performing an identification operation by calculating the vector correlation of a partial region of a pattern, this partial region need only be cut out beforehand.

As described above, necessary information is appropriately extracted from an image, subjected to predetermined conversion (to be described later), and stored as a feature vector for performing pattern identification in the registration pattern dictionary data holding unit 22. Practical contents of the processing performed in the registration pattern dictionary data generation unit 21 will be described later.

A registration pattern dictionary data selection unit 23 reads out necessary registration pattern dictionary data from the registration pattern dictionary data holding unit 22 in accordance with a request from the input pattern identification unit 6, and transfers the readout data to the input pattern identification unit 6.

<Registration Pattern Dictionary Data Generation Unit 21>

The registration pattern dictionary data generation unit 21 will be explained below with reference to FIG. 1C. A partial region setting unit 31 sets the position and range of a partial region from which a feature vector extraction unit 32 extracts a feature vector, in the image data (registration target pattern image data) acquired from the image recording unit 4. The position and range to be set are favorably predetermined by using the method of mechanical learning. For example, it is possible to set a plurality of partial region candidates, and select a partial region from these candidates by using AdaBoost. It is also possible to prepare a number of partial region combinations, and select one combination as a candidate by AdaBoost, as will be described later. A method of actually determining partial regions and their combinations by applying AdaBoost will be described in detail later in the explanation of the input pattern identification unit 6 (to be described later).

The number of partial regions may be preset as a predetermined number in accordance with the processing time or the like. It is also possible to measure the number of prepared learning samples by which satisfactory identification performance is obtained, and set this number as the number of partial regions.

The feature vector extraction unit 32 extracts a feature vector in the above-mentioned partial region from the image data (registration target pattern image data) acquired from the image recording unit 4. When the pattern is a person's face in the image, the feature vector extraction unit 32 typically performs a process of extracting data necessary for identification from the image containing the face. As the data necessary for identification, the luminance value of the partial region set by the partial region setting unit 31 is extracted as a feature vector. Instead of directly acquiring the luminance value, it is also possible to extract a feature vector from the result of a certain filtering operation using a Gabor filter or the like. The contents of the process performed by the feature vector extraction unit 32 will be described later.

A feature vector conversion unit 33 performs predetermined conversion on the feature vector extracted by the feature vector extraction unit 32, by using data stored in a feature vector conversion data holding unit 34. Examples of the feature vector conversion are dimensional compression using principal component analysis (PCA), and dimensional compression using independent component analysis (ICA). It is also possible to perform dimensional compression using locality preserving projection (LPP) or local Fisher discriminant analysis (LFDA).

When using PCA as the feature vector conversion method, there are parameters such as the number of bases (the number of dimensions to be reduced of a feature vector), and bases to be used. Instead of the number of bases, it is also possible to use the sum of eigenvalues corresponding to the base vector, that is, the cumulative proportion, as an index. These parameters can be changed from one partial region to another. Parameters to be actually set can be predetermined by mechanical learning.

The feature vector conversion data holding unit 34 holds data required for the feature vector conversion unit 33 to convert the feature vector. Examples of the data required for feature vector conversion are the above-mentioned setting information such as the number of bases (the number of dimensions to be reduced), and base vector numerical data preobtained by learning.

Next, the processing performed by the feature vector extraction unit 32 and feature vector conversion unit 33 will be explained with reference to FIG. 3A. In step S500, the feature vector extraction unit 32 acquires, from the partial region setting unit 31, the information indicating the partial region set by the partial region setting unit 31.

Then, in step S501, the feature vector extraction unit 32 acquires the image data from the image recording unit 4. In step S502, the feature vector extraction unit 32 acquires a feature vector from the partial region contained in the acquired image data and indicated by the information acquired in step S500.

The feature vector may typically be obtained by vectorizing luminance data acquired from the image data in the partial region. The feature vector can also be obtained by vectorizing a corresponding partial region from data having undergone predetermined conversion such as LBP (Local Binary Pattern) conversion.

Subsequently, in step S503, the feature vector conversion unit 33 converts the feature vector acquired in step S502, based on the data acquired from the feature vector conversion data holding unit 34. In this step, as already described above, the feature vector typically undergoes dimensional reduction by PCA, dimensional reduction by ICA, or the like. In this step, a predetermined statistical value, typically, an average vector or a maximum value of elements may be calculated for the acquired feature vector. Also, information of the position where the feature vector is cut out from the image can be recorded as a partial feature. As will be described later, it is also possible to record an identifier indicating the correspondence between a registration pattern and input pattern in order to perform the comparison and evaluation of corresponding partial features between them. These pieces of information can be output together with the feature vector, as the output from the registration pattern dictionary data generation unit 21.

By performing the processing as described above, a partial region is set, a feature vector is extracted from the set partial region, the extracted feature vector is converted, and data of the converted feature vector is stored in the registration pattern dictionary data holding unit 22, as the output from the registration pattern dictionary data generation unit 21.

<Input Pattern Identification Unit 6>

The input pattern identification unit 6 will be explained below with reference to FIG. 4A. An input pattern identification data generation unit 41 extracts information necessary for pattern identification, from the image data acquired from the image recording unit 4. A registration pattern dictionary data acquisition unit 42 acquires dictionary data necessary for pattern identification, from the pattern registration unit 5.

An input pattern identification operation unit 43 performs a pattern identification process by using the information acquired from the input pattern identification data generation unit 41, and the dictionary data acquired from the registration pattern dictionary data acquisition unit 42. Details of the identification process will be described later.

Processing performed by the input pattern identification unit 6 will now be explained with reference to FIG. 3B. First, in step S700, the registration pattern dictionary data acquisition unit 42 acquires dictionary data required for pattern identification from the pattern registration unit 5.

Then, in step S701, the input pattern identification data generation unit 41 acquires image data from the image recording unit 4. In step S702, the input pattern identification data generation unit 41 extracts information required for pattern identification from the acquired image data. Details of the processing in this step will be described later.

Subsequently, in step S703, the input pattern identification operation unit 43 performs a pattern identification process by using the information acquired from the input pattern identification data generation unit 41, and the dictionary data acquired from the registration pattern dictionary data acquisition unit 42. Information output as the result of this identification process expresses the match/mismatch with the registered data (dictionary data) by a binary number (0 or 1), or expresses a value (a real number of 0 to 1) obtained by normalizing the degree of match as a likelihood.

If there are a plurality of registration patterns (registrants), the likelihood can be output for each registration pattern (registrant), or only the result for a registration pattern that best matches the pattern of interest can be output. It is also possible to output not the likelihood for a registration pattern but the likelihood for a class to which the registration pattern belongs. That is, when the pattern is a person, the likelihood for the ID (name) of the person is output instead of the result for each individual registered face image. Note that details of the processing in step S703 will be described later.

<Input Pattern Identification Data Generation Unit 41>

Figure 4B:
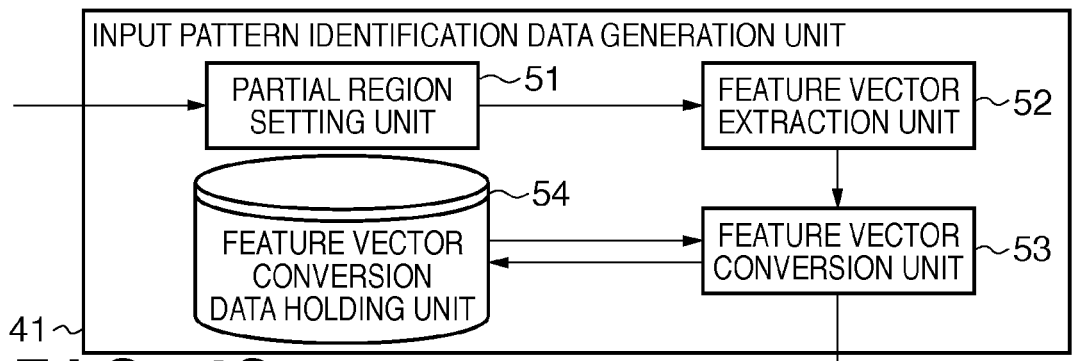
FIG. 4B is a block diagram showing a functional configuration example of an input pattern identification data generation unit 41.

The input pattern identification data generation unit 41 will be explained below with reference to FIG. 4B. The arrangement shown in FIG. 4B is almost the same as that shown in FIG. 1C. That is, the partial region setting unit 31 and a partial region setting unit 51 are almost the same, and the feature vector extraction unit 32 and a feature vector extraction unit 52 are almost the same. Also, the feature vector conversion unit 33 and a feature vector conversion unit 53 are almost the same, and the feature vector conversion data holding unit 34 and a feature vector conversion data holding unit 54 are almost the same. Therefore, the explanation of these units shown in FIG. 4B is the same as that of the respective corresponding units shown in FIG. 1C, so a repetitive explanation will be omitted.

<Input Pattern Identification Operation Unit 43>

Figure 4C:
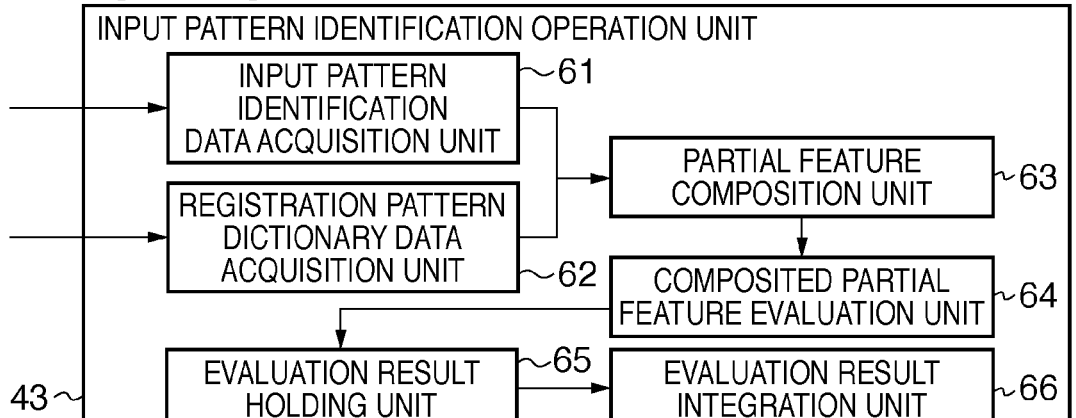
FIG. 4C is a block diagram showing a functional configuration example of an input pattern identification operation unit 43.

The input pattern identification operation unit 43 will be explained below with reference to FIGS. 4C and 5A. As an example, a process of identifying an input pattern based on the similarity between corresponding partial features will be explained.

First, in step S1001, an input pattern identification data acquisition unit 61 acquires information generated by the input pattern identification data generation unit 41, as input pattern identification data, from the input pattern identification data generation unit 41. Then, in step S1002, a registration pattern dictionary data acquisition unit 62 acquires registration pattern dictionary data from the registration pattern dictionary data acquisition unit 42.

In step S1003, a partial feature composition unit 63 composites partial features by using the input pattern identification data acquired by the input pattern identification data acquisition unit 61, and the registration pattern dictionary data acquired by the registration pattern dictionary data acquisition unit 62, thereby generating a composited partial feature.

The composited partial feature is a feature made up of a plurality of partial features. The composited partial feature is generated by combining partial features of a registration pattern and input pattern, so as to obtain the correspondence of the registration pattern and input pattern. Typically, a plurality of composited partial features are generated by combining several partial features, and output. Details of this partial feature composition process will be described later.

Subsequently, in step S1004, a composited partial feature evaluation unit 64 evaluates the composited partial feature generated by the partial feature composition unit 63. Typically, the composited partial feature evaluation unit 64 calculates a numerical value representing the similarity between a registration pattern and input pattern for each of a plurality of composited partial features, and outputs one value by integrating these numerical values. The contents of this composited partial feature evaluation process will be described later.

In step S1005, an evaluation result holding unit 65 stores the value as the result of the evaluation in step S1004. If all the dictionary data have been processed in steps S1001 to S1005, the process advances to step S1007 via step S1006; if not, the process returns to step S1002 via step S1006.

In step S1007, an evaluation result integration unit 66 integrates the evaluation results stored and held in the evaluation result holding unit 65. This processing is most simply a process of outputting, as an identification result, registration pattern dictionary data for which the output value of the composited partial feature evaluation process is largest. It is also possible to output the results of high-order registration pattern dictionary data having high degrees of match in the form of a list.

<Partial Feature Composition Unit 63>

Figure 4D:
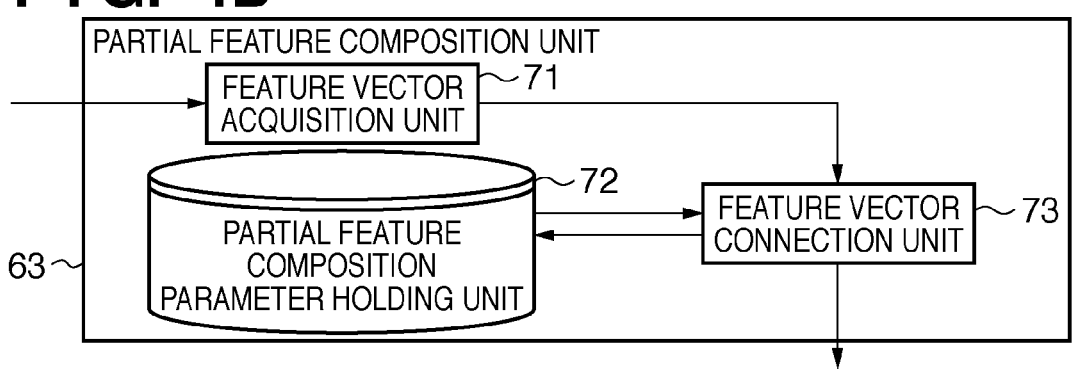
FIG. 4D is a block diagram showing a functional configuration example of a partial feature composition unit 63.

The partial feature composition unit 63 will be explained below with reference to FIG. 4D. A feature vector acquisition unit 71 acquires a feature vector and its attendant information from the input pattern identification data acquired from the input pattern identification data generation unit 41, and the registration pattern dictionary data acquired from the registration pattern dictionary data acquisition unit 42, and temporarily holds the acquired vector and information.

Examples of the attendant information are position information obtained when the feature vector is cut out from an image, parameters of conversion such as PCA performed on the cut vector, or an identifier expressing these pieces of information as a character string.

A partial feature composition parameter holding unit 72 holds a parameter (partial feature composition parameter) for generating a composited partial feature to be referred to by a feature vector connection unit 73. This parameter is typically the number of partial features to be composited as one feature, coordinate information of the cut position of the target feature vector, or the feature vector identifier as described above. This parameter can be determined by using the method of mechanical learning. A partial feature composition parameter determination method using the method of AdaBoost will be explained later.

The feature vector connection unit 73 acquires the partial feature composition parameter from the partial feature composition parameter holding unit 72, and connects feature vectors by referring to the parameter. Details of the connection process will be described later.

The processing performed by the partial feature composition unit 63 will be explained below with reference to FIG. 5B. First, in step S1201, the feature vector acquisition unit 71 acquires partial feature vectors from the registration pattern dictionary data or input pattern identification data. Then, in step S1202, the feature vector connection unit 73 acquires a partial feature composition parameter from the partial feature composition parameter holding unit 72. In step S1203, the feature vector connection unit 73 refers to the partial feature composition parameter acquired in step S1202, and determines combinations of connection targets among the partial feature vectors acquired by the feature vector acquisition unit 71. More specifically, feature vectors corresponding to a plurality of partial features are grouped in accordance with the above-mentioned parameter. Parameters for designating the number of partial features included in one group, the number of groups into which all the partial features are divided, and the like may be predetermined by using the method of mechanical learning. A procedure of determining these parameters by using AdaBoost will be explained later.

Subsequently, in step S1204, the feature vector connection unit 73 connects the feature vectors grouped based on the parameters. This connecting process can be performed by connecting a plurality of vectors as one numerical value string, or by attaching, to respective feature vectors, tag information indicating that the respective feature vectors belong to the same group. In later processing, the connected feature vectors are processed as one numerical value string in some cases, and evaluated as individual partial feature vectors in other cases. Therefore, it is favorable to hold information of the connection point. Also, in later processing, a composited partial feature generated from a registration pattern and that generated from an input pattern are sometimes processed as they are made to correspond to each other. Accordingly, it is favorable to add an identifier that makes the composited partial features identifiable so as to indicate the correspondence.

<Composited Partial Feature Evaluation Unit 64>

Figure 6A:
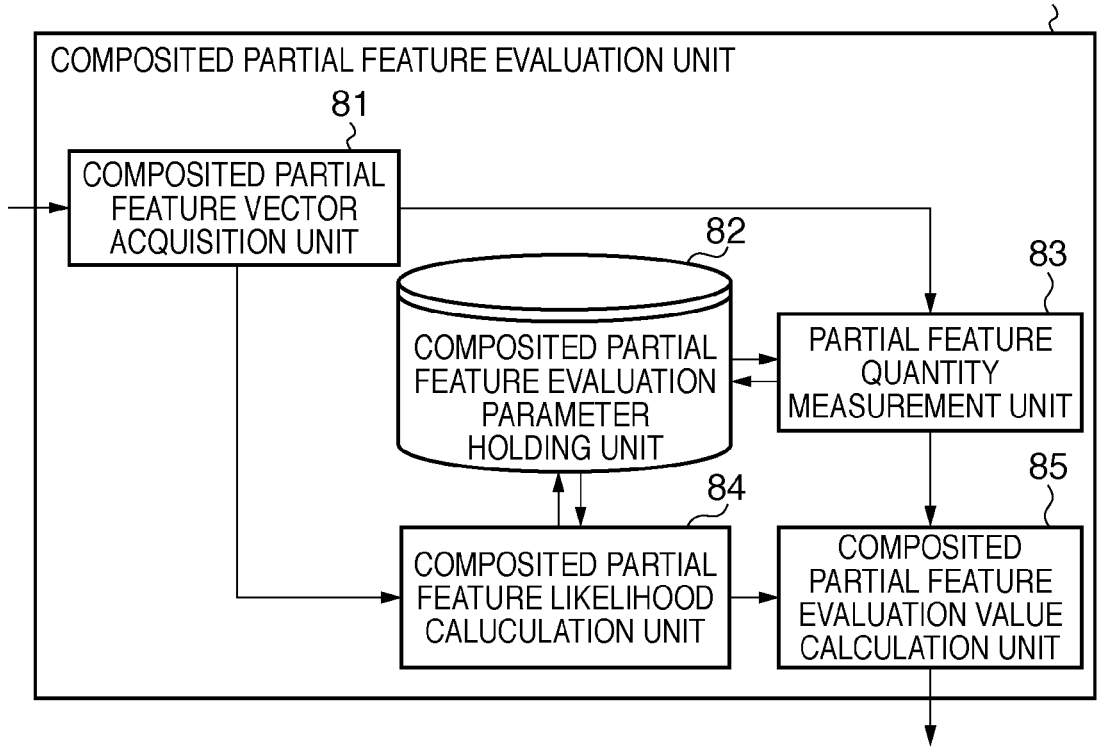
FIG. 6A is a block diagram showing a functional configuration example of a composited partial feature evaluation unit 64.

The composited partial feature evaluation unit 64 will be explained below with reference to FIG. 6A. A composited partial feature vector acquisition unit 81 acquires composited partial features from the partial feature composition unit 63. A composited partial feature evaluation parameter holding unit 82 holds parameters to be used in a partial feature quantity measurement unit 83 and composited partial feature likelihood calculation unit 84 (to be described later). Details of the parameters will be explained later.

The partial feature quantity measurement unit 83 determines whether partial features included in one composited partial feature satisfy a predetermined criterion, and measures the quantity of partial features meeting the predetermined condition. Details of the processing performed by the partial feature quantity measurement unit 83 will be described later.

The composited partial feature likelihood calculation unit 84 calculates the likelihood of the composited partial feature. Details of the process of calculating the likelihood of the composited partial feature will be described later. A composited partial feature evaluation value calculation unit 85 calculates the evaluation value of the composited partial feature by using the result of measurement performed by the partial feature quantity measurement unit 83, and the likelihood of the composited partial feature obtained by the composited partial feature likelihood calculation unit 84. Details of the process of calculating this evaluation value will be described later.

Since a plurality of composited partial features may exist, the evaluation value calculation process includes a process of integrating the evaluation values of a plurality of composited partial features into one value. For example, the average of the evaluation values of all the composited partial features, the average of a predetermined number of evaluation values selected in descending order from a highest evaluation value, or the like is output as a final evaluation value.

Figure 7A:
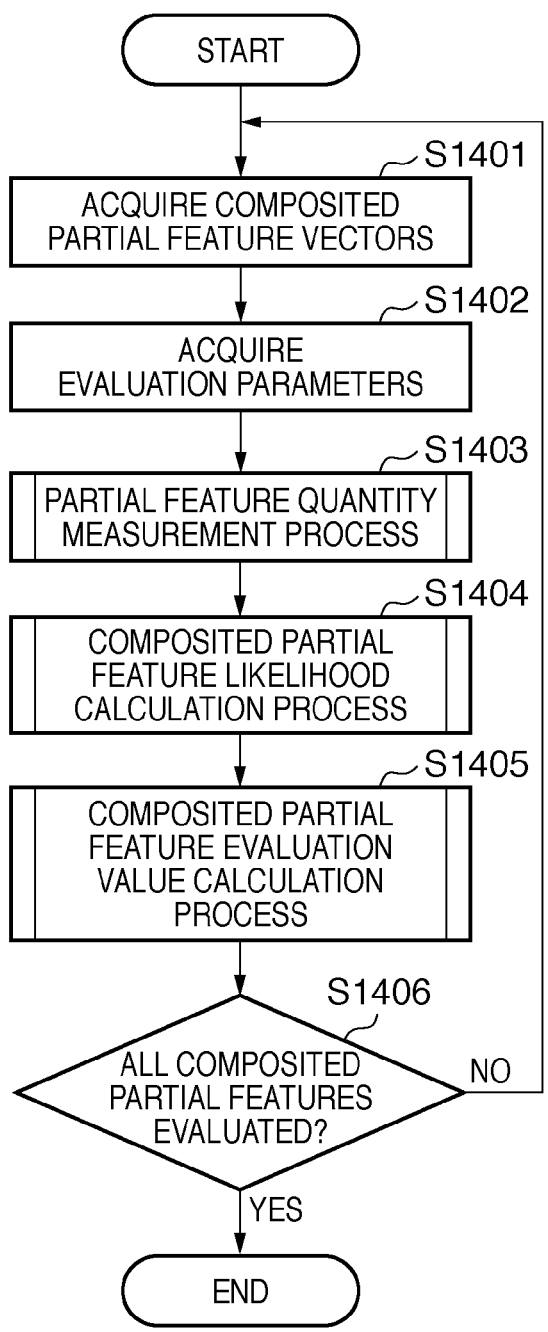
FIG. 7A is a flowchart of processing performed by the composited partial feature evaluation unit 64.

The processing performed by the composited partial feature evaluation unit 64 will be explained below with reference to FIG. 7A. First, in step S1401, the composited partial feature vector acquisition unit 81 acquires composited partial features (composited partial feature vectors) from the partial feature composition unit 63. Composited partial feature vectors are generated from both a registration pattern and input pattern. In this processing, therefore, composited partial features corresponding to each other in a registration pattern and input pattern are acquired.

Then, in step S1402, the partial feature quantity measurement unit 83 acquires evaluation parameters from the composited partial feature evaluation parameter holding unit 82. The evaluation parameters are parameters to be used in later processing. Examples are numerical value data such as a threshold value, and an evaluation function for evaluating a partial feature of a registration pattern and a corresponding partial feature of an input pattern. Note that these parameters can be set for each partial feature, and can also be common to partial features belonging to the same composited partial feature.

Subsequently, in step S1403, the partial feature quantity measurement unit 83 refers to the parameters acquired in step S1402, evaluates partial features belonging to the composited partial feature vector, and measures the quantity of partial features meeting the predetermined condition. Details of the processing in this step will be described later.

In step S1404, the composited partial feature likelihood calculation unit 84 calculates the likelihood of the composited partial feature. The likelihood of the composited partial feature can be predetermined by using mechanical learning, and can also dynamically be calculated in accordance with the corresponding composited partial features in the input pattern and registration pattern. This process of calculating the likelihood of the composited partial feature will be described in detail later.

In step S1405, the composited partial feature evaluation value calculation unit 85 calculates the evaluation value of the composited partial feature by using the result of measurement performed by the partial feature quantity measurement unit 83, and the composited partial feature likelihood calculated by the composited partial feature likelihood calculation unit 84. Details of this evaluation value calculation process will be described later.

If all the composited partial features have undergone the processing in steps S1401 to S1405, this process is terminated via step S1406; if not, the process returns to step S1401 via step S1406.

<Details of Processing in Step S1403>

Figure 7B:
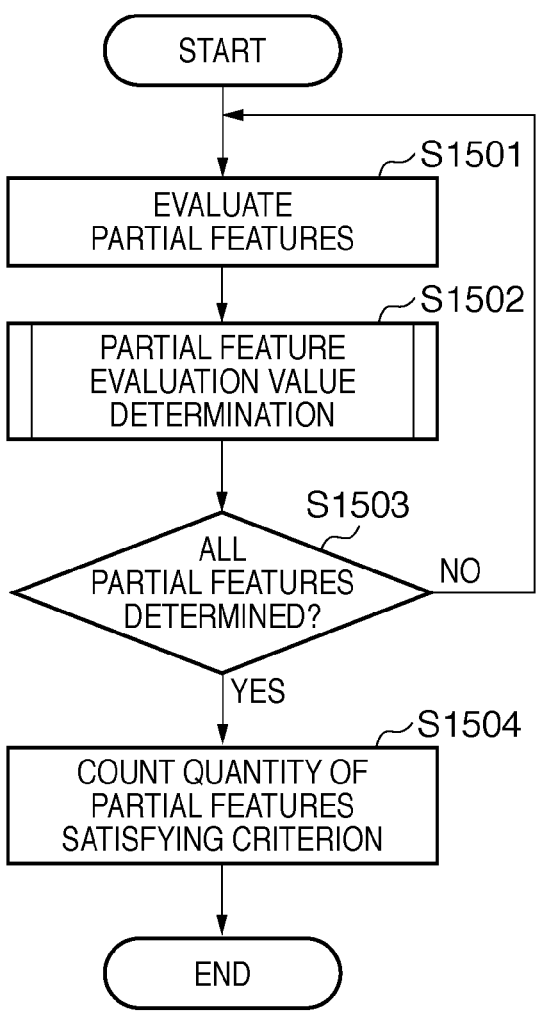
FIG. 7B is a flowchart showing details of processing in step S1403.

Details of the processing in step S1403 will be explained below with reference to FIG. 7B. First, in step S1501, the partial feature quantity measurement unit 83 evaluates partial features by referring to the parameters acquired in step S1402. As an example of the evaluation, a method using the similarity between a partial feature of a registration pattern and a corresponding partial feature of an input pattern will be explained. A similarity θ can be obtained by, for example, the inner product of partial feature vectors. More specifically, the similarity θ can be calculated by $$\theta = \sum_{i=1}^{l} u_i \times v_i \quad (1)$$

where u and v respectively represent partial feature vectors generated from a registration pattern and input pattern, and l represents the number of dimensions of a feature vector. Note that the similarity can also be obtained by another method. For example, it is possible to use the normalized correlation or distance between feature vectors as the similarity.

Then, in step S1502, the partial feature quantity measurement unit 83 evaluates the similarity obtained as described above. More specifically, the partial feature quantity measurement unit 83 determines, for example, whether the similarity obtained in step S1501 has exceeded a predetermined threshold value.

If all the partial features included in the same composited partial feature have undergone the processing in steps S1501 and S1502, the process advances to step S1504 via step S1503; if not, the process returns to step S1501 via step S1503.

In step S1504, the partial feature quantity measurement unit 83 measures the quantity of partial features for which the similarity has exceeded a predetermined criterion. Typically, the number of partial features having exceeded a threshold value need only be counted. In the process of measuring a quantity n, a partial feature aggregate function can be defined by $$n = \sum_{i=1}^{m} C(\theta) \quad (2)$$

$$C(\theta) = \begin{cases} 1 & (\text{if } \theta > \omega) \\ \frac{\theta}{\omega} & (\text{if } \omega \geq \theta > \frac{\omega}{2}) \\ 0 & (\text{if } \frac{\omega}{2} \geq \theta) \end{cases} \quad (3)$$

where m is the number of partial features existing in the same composited partial feature, and ω is the threshold value. Thus, the quantity of partial features can be measured by taking account of partial features near the threshold value.

<Composited Partial Feature Likelihood Calculation Unit 84>

Figure 6B:
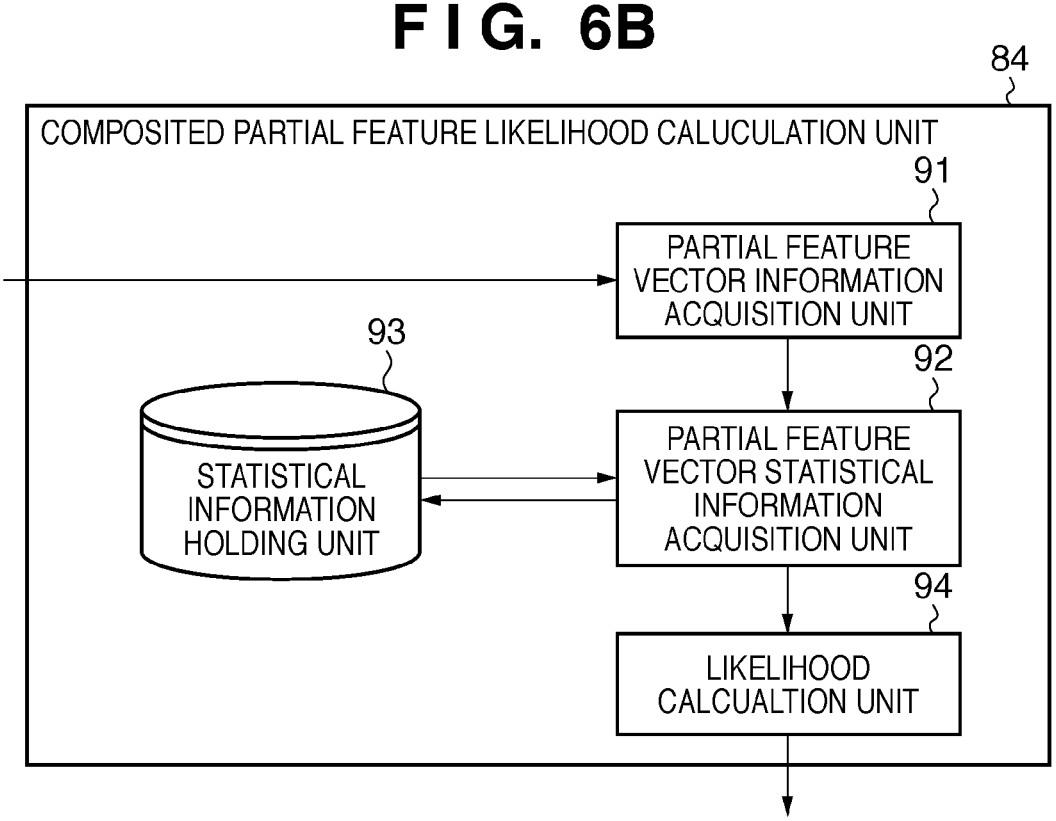
FIG. 6B is a block diagram showing a functional configuration example of a composited partial feature likelihood calculation unit 84.

The composited partial feature likelihood calculation unit 84 will be explained below with reference to FIG. 6B. A partial feature vector information acquisition unit 91 acquires information of partial feature vectors as constituent elements of a composited partial feature vector, from the composited partial feature vector acquisition unit 81. Practical examples of the information to be acquired are the number of dimensions of a partial feature vector, the spatial position and size on a pattern from which the vector is cut out, a feature vector conversion method, and attached parameter information. When the feature vector conversion method is PCA, examples of the parameter information are the number of dimensions to be reduced, the cumulative proportion, and the number of data used in PCA learning. These pieces of information to be acquired are acquired together with the composited partial feature data by the composited partial feature vector acquisition unit 81.

A partial feature vector statistical information acquisition unit 92 acquires statistical information of the information acquired by the partial feature vector information acquisition unit 91. Details of the process of acquiring the statistical information will be described later.

A statistical information holding unit 93 holds the above-mentioned statistical information. Note that the statistical information holding unit 93 may hold statistical information preobtained outside the apparatus. A likelihood calculation unit 94 calculates the likelihood of the composited partial feature vector based on the information obtained by the partial feature vector statistical information acquisition unit 92. Practical contents of the processing will be described later.

The processing performed by the composited partial feature likelihood calculation unit 84 will be explained below with reference to FIG. 8A. First, in step S1701, the partial feature vector information acquisition unit 91 acquires information of partial feature vectors as constituent elements of a composited partial feature vector from the composited partial feature vector acquisition unit 81. As described above, the partial feature vector information can be various kinds of information such as the spatial position and size on a pattern from which the partial feature vectors are cut out.

Then, in step S1702, the partial feature vector statistical information acquisition unit 92 acquires statistical information of the information acquired by the partial feature vector information acquisition unit 91. In step S1703, the likelihood calculation unit 94 calculates the likelihood of a composited partial feature based on the statistical information obtained by the partial feature vector statistical information acquisition unit 92. As an example, a case in which the partial feature vector information indicates the spatial position and size on a pattern from which the partial feature vectors are cut out and the statistical information to be acquired is the variance of the former information will be explained. In this case, variances are obtained for the position and size of the partial feature vector by $$\sigma_p = \frac{1}{l-1} \sum_{i=1}^{l} (v - \bar{v})^2 \quad (4)$$

$$\sigma_s = \frac{1}{l-1} \sum_{i=1}^{l} (s - \bar{s})^2 \quad (5)$$

where l is the number of partial features included in the composited partial feature, v and $\bar{v}$ are respectively the cut positions and cut position average of the partial features, and s and $\bar{s}$ are respectively the sizes and size average of the partial features. Based on the above-mentioned statistical information, the likelihood of the composited partial feature can be calculated by $$\sigma = \frac{\sigma_p + \sigma_s}{2} \quad (6)$$

The following effect can be expected by thus using the averages of variances of the positions and sizes of partial features as the likelihood of the composited partial feature. That is, as the variance of the attendant information (position and size) of the partial feature forming the composited partial feature increases, the variety of measures with which a pattern as an identification target is observed increases. Therefore, a high propriety of the composited partial feature can directly be expressed. When the identification target pattern is a person's face in an image, the propriety presumably increases when determination is performed using the vicinities of the mouth and nose in addition to the vicinities of the eyes.

Instead of the spatial information of the partial feature vector, the variance of a parameter concerning the conversion of the feature vector can be used as the likelihood. More specifically, when the dimension compression ratio (the cumulative proportion of PCA) changes from one partial feature to another, the variance of the dimension compression ratio can be used as the likelihood.

Also, the difference between the feature vector extraction methods can be used as the likelihood. Most simply, the type of extraction method is directly used as the likelihood. For example, the likelihood is 1 when all partial features in a composited partial feature are extracted from a luminance image, and 2 when these partial features are extracted by a plurality of methods, for example, extracted from a luminance image and from an image filtered by a Gabor filter.

Furthermore, the likelihood can be predetermined from learning data. It is also possible to premeasure the identification performance of each partial feature for learning data, store the identification performances in the statistical information holding unit 93, and use the average of the identification performances as the likelihood of a composited partial feature. The likelihood of a composited partial feature can also be calculated by combining the likelihood obtained from the variance of a partial feature and the likelihood obtained from learning data.

<Processing Performed by Composited Partial Feature Evaluation Value Calculation Unit 85>

The processing performed by the composited partial feature evaluation value calculation unit 85 will be explained below with reference to FIG. 8B. First, in step S1801, the composited partial feature evaluation value calculation unit 85 acquires the composited partial feature vector from the partial feature quantity measurement unit 83. Then, in step S1802, the composited partial feature evaluation value calculation unit 85 acquires, from the partial feature quantity measurement unit 83, the result of measurement performed by the partial feature quantity measurement unit 83. In step S1803, the composited partial feature evaluation value calculation unit 85 acquires, from the composited partial feature likelihood calculation unit 84, the composited partial feature likelihood calculated by the composited partial feature likelihood calculation unit 84. In step S1804, the composited partial feature evaluation value calculation unit 85 calculates the evaluation value of the composited partial feature based on $$V_g = \sigma \exp(n) \tag{7}$$

where n is the measurement result of the partial feature quantity, and $\sigma$ is the likelihood of the composited partial feature. In this way, the evaluation value can largely be changed by the difference between the quantities by which partial features belonging to the composited partial feature satisfy the predetermined criterion. The effect of performing identification by combining partial features is to produce a large difference between the evaluation value in a state in which a plurality of partial features satisfy the criterion, and the evaluation value in a state in which only one partial feature satisfies the criterion. When identifying a person's face, for example, partial features of different persons may accidentally match depending on variations in illumination condition or expressions, but the probability that a plurality of pairs of partial features simultaneously match is presumably low. In other words, if a plurality of pairs of partial regions simultaneously match, the possibility that a registration pattern and input pattern belong to the same class is higher than that when only one pair of partial regions match. Based on this expectation, the state in which a plurality of pairs of partial features satisfy the criterion is represented by the quantity, and used in identification.

When using the quantity in evaluation, identification more robust to variations may be performed. For example, the following evaluation function can be used instead of equation (7) described above.

$$V_g = \sigma \sum_i w_i \cdot r_i \tag{8}$$

where r is the similarity of corresponding partial features in a registration pattern and input pattern, and w is the weight of each similarity for obtaining the weighted sum. In this case, if similarity having a large weight differs from an expected value under the influence of, for example, an illumination variation, the influence on the evaluation value increases. By contrast, it is possible to avoid increasing the weight of a specific partial feature by representing the partial feature by the quantity as indicated by equation (7). Consequently, identification is expected to become robust to variations. Also, weighting can be performed between a plurality of composited partial features by multiplication using the composited partial feature likelihood.

The evaluation value calculation using equation (7) or (8) is merely an example, and another expression is naturally possible. An example is a polynomial of the quantity n of partial features. Instead of directly using the quantity n of partial features, it is also possible to use the quantity n after normalizing it by dividing it by the number 1 of partial features included in a composited partial feature. In this case, even when partial features included in a plurality of composited partial features vary, the level of the evaluation value of each composited partial feature can be made constant.

The essence of this embodiment is to determine the evaluation value of a composited partial feature in accordance with the quantity n of partial features. An actual composited partial feature evaluation function can be an optimum function selected in accordance with a category to be identified, and is not limited to the function form used in this explanation.

When a plurality of composited partial features exist, they are integrated and output as one value. The method of integration is most simply the average of composited partial features. The average of evaluation values obtained by equation (7) or (8) is used as a final output value. It is also possible to use only a composited partial feature having a high likelihood. Furthermore, before calculating the average, it is possible to select only composited partial features having high likelihoods, and calculate the average by using the selected composited partial features alone.

<Learning Methods of Partial Feature & Composited Partial Feature>

A procedure when using AdaBoost in the learning of parameters for generating a composited partial feature by combining partial features will be explained below. Note that this processing need not always be performed in the image processing apparatus because the processing can be performed off-line beforehand. Either way, learned parameters are stored in the partial feature composition parameter holding unit 72. Note also that the processing herein explained generally relates to the known techniques, so the explanation will appropriately be omitted except for portions according to this embodiment (portions relevant to the essence).

First, an example of a partial region learning process will be explained with reference to FIG. 8C. Note that the main apparatus of this process can be the image processing apparatus or another apparatus as described above. First, learning data is acquired in step S1901. When processing a person's face, a large number of images each containing a face having a label representing an identifier of the individual are prepared as learning data. It is desirable to prepare a sufficient number of images for each person. To learn partial feature and feature vector conversion methods strong against illumination variations and expression variations, it is important to prepare samples sufficiently containing the above-mentioned variations as learning data. This makes it possible to generate two kinds of data, that is, data representing variations in face of an individual (data belonging to intra-class), and data representing variations in faces of different persons (data belonging to extra-class), from the labeled face images. That is, it is possible to generate intra-class data from face images having the same label, and extra-class data from face images having different labels.

Then, a weak hypothesis selecting process is performed in step S1902. A weak hypothesis can be made to correspond to a combination of partial features (a composited partial feature) in this embodiment. That is, a large number of partial features different in parameters concerning partial features are prepared. Examples of the parameters are the spatial position and size, the feature vector conversion method, and the number of dimensions to be reduced. Combinations of these partial features having different parameters are made to correspond to weak hypotheses, and selected by the framework of AdaBoost. It is also possible to consider the composited partial feature evaluation method as one parameter, in addition to partial feature combinations. That is, even when composited partial features are made up of the same partial features, these composited partial features can be processed as different weak hypotheses if evaluation functions represented by equation (7) or (8) are different.

Weak hypotheses equal in number to the combinations of the partial features and the parameters concerning evaluation are prepared, and a weak hypothesis having highest performance is selected in accordance with the framework of AdaBoost, with respect to the learning data acquired in step S1901. That is, a weak hypothesis by which the partial feature combination and its evaluation method are optimum for the learning data is selected. A practical procedure of evaluating the performance can be performed in the same manner as in the example described in the explanation of the composited partial feature evaluation unit 64. Whether the identification results are correct between persons having the same label (but different images) and between persons having different labels is determined, and the weighted error rate of the learning data is calculated.

After the weak hypothesis having highest performance is selected, the process advances to step S1903, and the weight of the learning data is updated based on the identification result concerning the learning data of the weak hypothesis. Subsequently, whether the number of weak hypotheses has reached a predetermined number is determined. If it is determined that the number of weak hypotheses has reached the predetermined number, this process is terminated. On the other hand, if it is determined that the number of weak hypotheses has not reached the predetermined number, the process returns to step S1902, and a new weak hypothesis is selected.

Note that detailed procedures of learning using AdaBoost, for example, the method of calculating the weighted error rate and the method of updating the weight of learning data can be found by appropriately referring to methods described in the following reference and the like.

Viola & Jones (2001) "Rapid Object Detection using a Boosted Cascade of Simple Features", Computer Vision and Pattern Recognition It is also possible to apply an optimization method such as a genetic algorithm (GA) when combining a plurality of partial features. In this case, not all weak hypotheses are prepared before the procedure of AdaBoost begins, but candidates are dynamically constructed while selecting weak hypotheses. That is, weak hypotheses having high performance are selected from some prepared weak hypothesis candidates (generated by, for example, combining partial features at random). A new weak hypothesis candidate is generated by combining high-performance weak hypothesis candidates, and the performance of the generated candidate is evaluated. This makes it possible to efficiently narrow down weak hypothesis candidates. In this way, the increase in learning time can be suppressed.

It is also possible to select only partial features as weak hypotheses by AdaBoost, and select combinations of partial features by another framework. For example, it is possible to form a number of partial region combinations, evaluate the likelihood by the method explained in the example of the composited partial feature likelihood calculation process, and select combinations having high likelihoods. Furthermore, these high-likelihood combinations can be selected as new weak hypotheses by the framework of AdaBoost. This makes it possible to solve the problem that the explosion of the number of combinations makes the learning time enormous. Consequently, parameters concerning partial features and their combinations and parameters concerning the evaluation method can be determined by evaluating learning data.

Second Embodiment

This embodiment differs from the first embodiment in contents of processing in a pattern registration unit 5 and input pattern identification unit 6. More specifically, while the attributes of a pattern are not taken into consideration in the first embodiment, the attributes of a pattern are estimated and a composited partial feature corresponding to the pattern attributes is set in this embodiment.

Note that only differences of this embodiment from the first embodiment will be explained below. An image processing apparatus according to this embodiment has an arrangement in which the pattern registration unit 5 and input pattern identification unit 6 in the arrangement shown in FIG. 1A are respectively replaced with a pattern registration unit 105 and input pattern identification unit 106. Therefore, the pattern registration unit 105 and input pattern identification unit 106 will be explained below. Note also that in the following explanation, a pattern to be identified is a person's face in an image for the sake of convenience. However, the following explanation is of course applicable to patterns other than a person's face.

<Pattern Registration Unit 105>

Figure 9A:
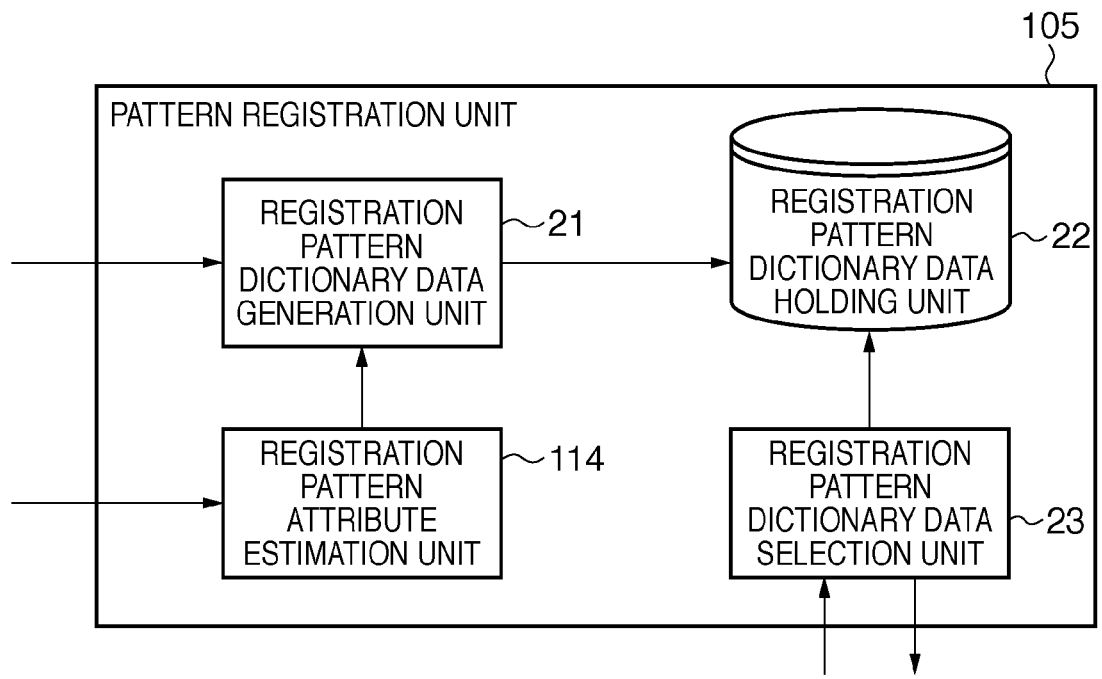
FIG. 9A is a block diagram showing a functional configuration example of a pattern registration unit 105.

First, the pattern registration unit 105 as a pattern registration unit according to this embodiment will be explained with reference to FIG. 9A. As shown in FIG. 9A, the pattern registration unit 105 has an arrangement including a registration pattern attribute estimation unit 114 in addition to the arrangement shown in FIG. 1B.

The registration pattern attribute estimation unit 114 performs a process of estimating the attributes of a pattern from image data acquired from an image recording unit 4. When the pattern is a specific object, practical attributes to be estimated include the size, posture, and direction of the object, and an illumination condition. When the pattern is a specific object, more specifically, a person's face, the organ positions in the face are detected. More specifically, the end points of constituent elements such as the eyes, mouth, and nose are detected. As an algorithm for detecting the end points, it is possible to use, for example, a method using a convolutional neural network described in Japanese Patent No. 3078166. As the end points, portions presumably expressing the features of an individual, such as the right and left eyes, the two end points of the mouth, and the nose, are preselected. The positional relationships between the end points of the face organs are detected as attributes. It is also possible to estimate attributes such as the age, sex, and expression of a person as other attributes. Known techniques can be used to estimate these attributes. For example, person's attributes can be estimated by using a method as disclosed in Japanese Patent Laid-Open No. 2003-242486.

Not only persons but also general objects can be detected by the above-mentioned method by changing learning data. This makes it possible to detect elements other than the face organs of a person, for example, occlusion objects such as eyeglasses, a mask, and hands. The occlusions as described above can be included in the attributes of a person's face.

Camera parameters can be used in attribute estimation. For example, an attribute such as the illumination condition can accurately be estimated by acquiring parameters pertaining to AE (Automatic Exposure) and AF (Automatic Focusing) for controlling image sensing from an image sensing control unit 3. Practical examples of the camera parameters are the exposure conditions, white balance, focusing, and object size. For example, the color attribute of an object can be estimated without any influence of the image sensing conditions, by preforming a correspondence table of color components corresponding to the exposure conditions, white balance, and skin color component region, and holding the table as a lookup table. It is also possible to estimate the size of an object by measuring the distance to the object by using a distance measurement technique such as AF. More specifically, a size s (the number of pixels) of an object in an image can be estimated in accordance with $$s=(f/d-f)\cdot S \qquad (9)$$

where f is the focal length, d is the distance from an image sensing unit 2 to the object, and S is the actual size of the object. Assume that d>f. In this manner, the size of an object can be estimated as an attribute without being influenced by the image sensing conditions.

Attribute information indicating the pattern attributes estimated by the registration pattern attribute estimation unit 114 is stored, together with registration pattern dictionary data output from a registration pattern dictionary data generation unit 21, in a registration pattern dictionary data holding unit 22.

Figure 10A:
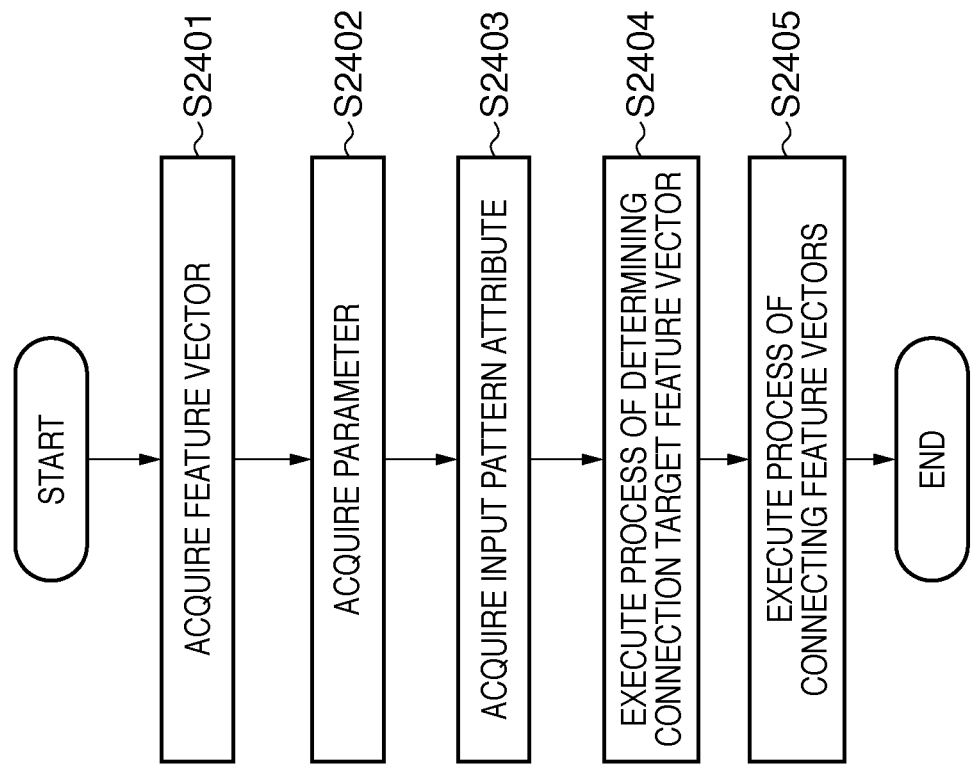
FIG. 10A is a flowchart of processing performed by a registration pattern dictionary data generation unit 21.

Processing performed by the registration pattern dictionary data generation unit 21 is also slightly different from that of the first embodiment. The processing performed by the registration pattern dictionary data generation unit 21 according to this embodiment will be explained below with reference to FIG. 10A.

First, in step S2101, the attribute information is acquired from the registration pattern attribute estimation unit 114. When the pattern is a person's face, the attribute information to be acquired is typically information of the positions and end points of organs of the person's face.

Then, in step S2102, feature vector acquisition positions are set in the face image by using the attribute information acquired in step S2101. More specifically, the feature vector acquisition positions are set as follows.

First, a predetermined one of a plurality of face organ end points acquired as the attribute information is set as a reference point. In addition, the distance between at least two other end points is measured, and a partial region is set apart from the reference point by a length that is a predetermined multiple of the distance between the two points. A predetermined value is used as the direction from the reference point. The end point as the reference point, the two points as reference points of the distance, a constant for determining the predetermined multiple of the distance between the two points, the direction from the reference point, and the like can be predetermined by learning. The learning of these parameters can be implemented by the partial region selecting method using AdaBoost explained in the first embodiment, by including the parameters in partial feature parameters. Steps S2103 and S2104 are respectively the same as steps S502 and S503 shown in FIG. 3A, so a repetitive explanation will be omitted.

<Input Pattern Identification Unit 106>

Figure 9B:
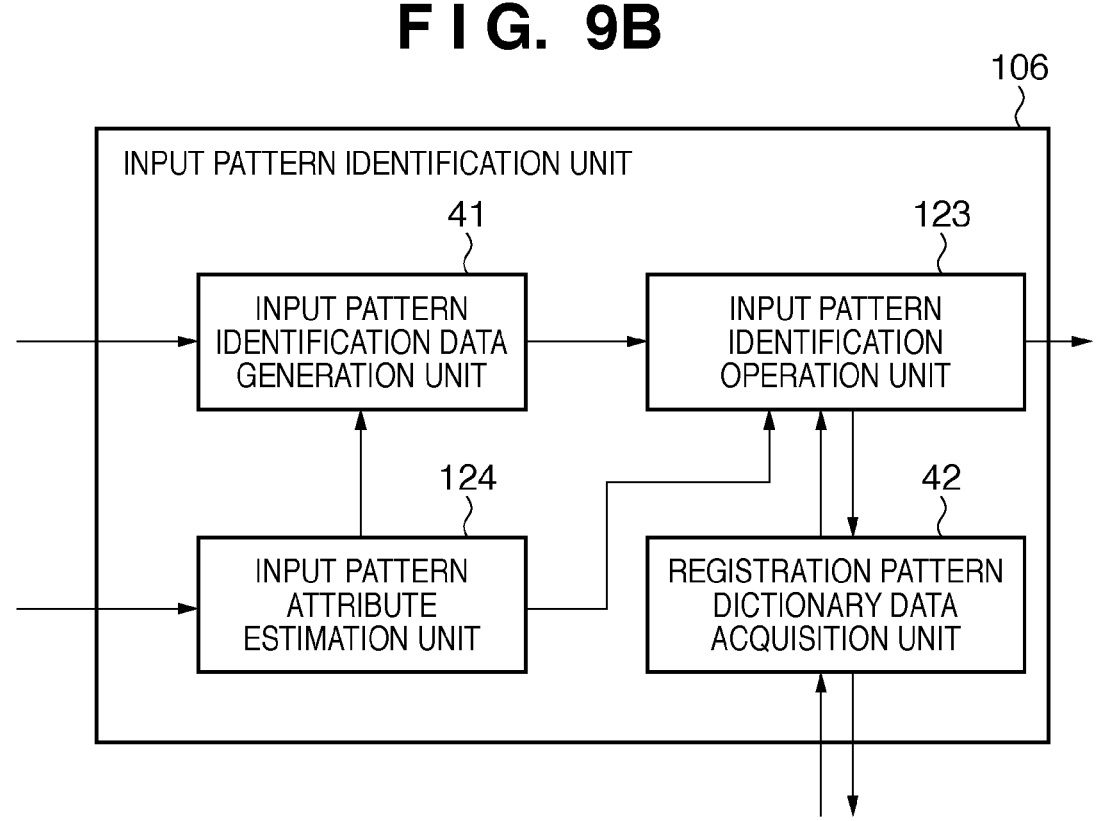
FIG. 9B is a block diagram showing a functional configuration example of an input pattern identification unit 106.

Next, the input pattern identification unit 106 will be explained with reference to FIG. 9B. As shown in FIG. 9B, the input pattern identification unit 106 has an arrangement obtained by replacing the input pattern identification operation unit 43 in the arrangement shown in FIG. 4A with an input pattern identification operation unit 123, and adding an input pattern attribute estimation unit 124. The input pattern attribute estimation unit 124 performs the same processing as that of the registration pattern attribute estimation unit 114.

An input pattern identification data generation unit 41 acquires image data from the image recording unit 4, and performs a feature vector conversion process by using the estimation results from the input pattern attribute estimation unit 124. This process is almost the same as that performed in the pattern registration unit 105, so a repetitive explanation will be omitted.

The input pattern identification operation unit 123 performs an input pattern identification process based on inputs from the input pattern identification data generation unit 41, a registration pattern dictionary data acquisition unit 42, and the input pattern attribute estimation unit 124. Details of the process performed by the input pattern identification operation unit 123 according to this embodiment will be described later.

Based on a request from an input pattern identification operation unit 43, the registration pattern dictionary data acquisition unit 42 acquires registration pattern dictionary data from the registration pattern dictionary data holding unit 22 in the pattern registration unit 105.

<Input Pattern Identification Operation Unit 123>

Figure 11:
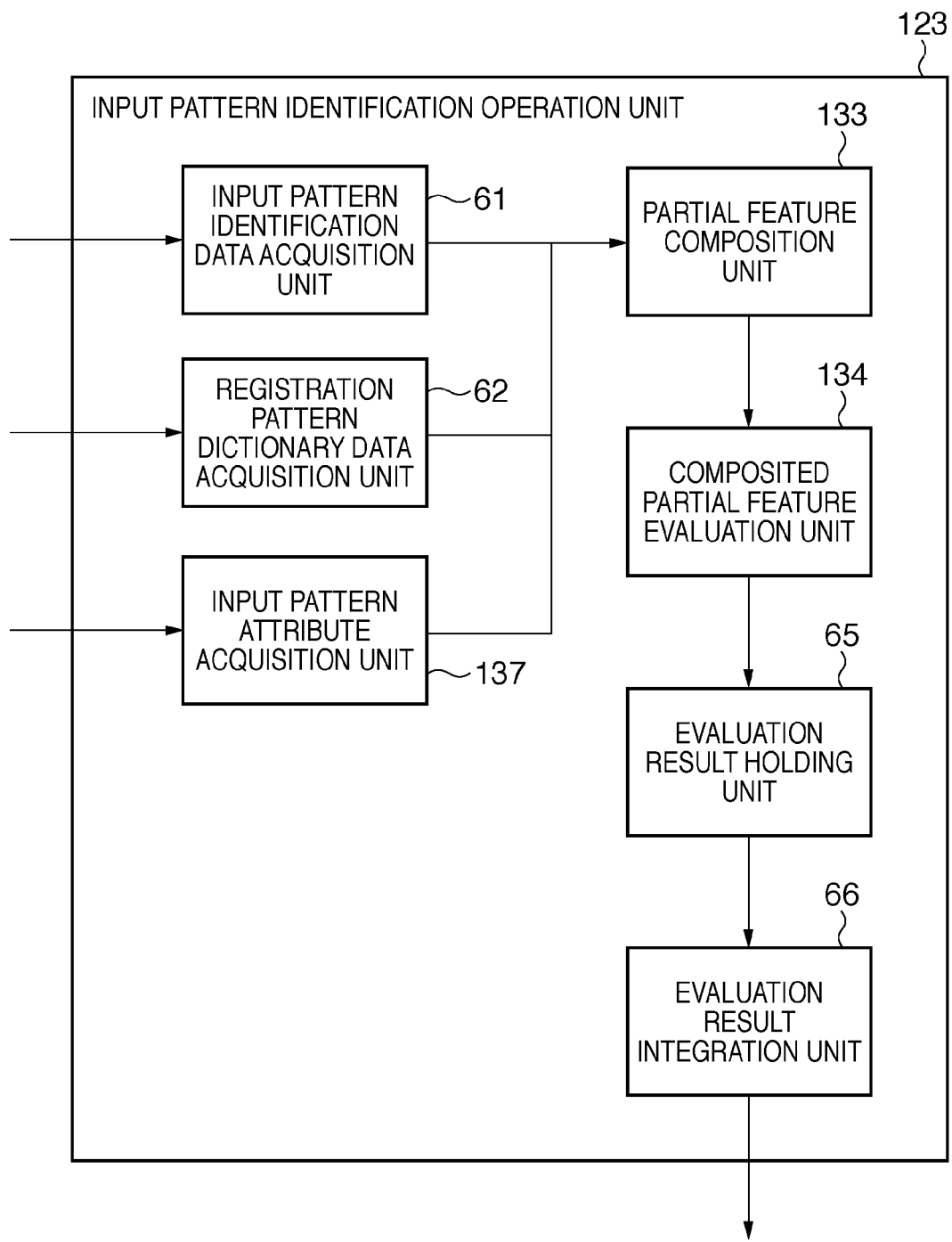
FIG. 11 is a block diagram showing a functional configuration example of an input pattern identification operation unit 123.

The input pattern identification operation unit 123 will be explained below with reference to FIG. 11. The input pattern identification operation unit 123 has an arrangement obtained by respectively replacing the partial feature composition unit 63 and composited partial feature evaluation unit 64 in the arrangement shown in FIG. 4C with a partial feature composition unit 133 and composited partial feature evaluation unit 134, and adding an input pattern attribute acquisition unit 137. The input pattern attribute acquisition unit 137 acquires the attribute information from the input pattern attribute estimation unit 124. The configuration of each of the partial feature composition unit 133 and composited partial feature evaluation unit 134 is the same as that of the first embodiment, but processing to be executed is slightly different.

<Processing Performed by Partial Feature Composition Unit 133>

Figure 10B:
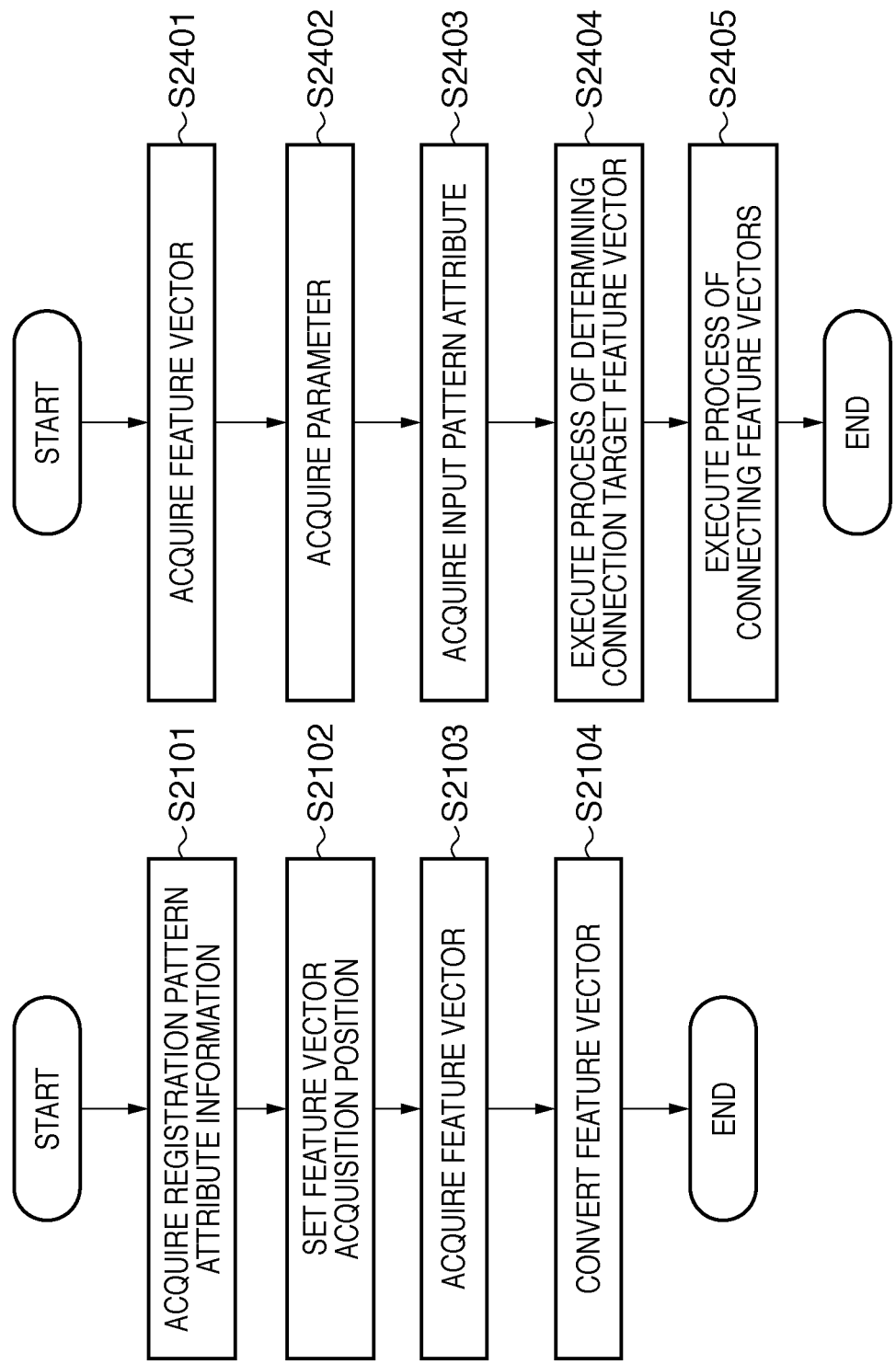
FIG. 10B is a flowchart showing processing performed by a partial feature composition unit 133.

The processing performed by the partial feature composition unit 133 will be explained below with reference to FIG. 10B. First, in step S2401, partial feature vectors are acquired from the registration pattern dictionary data or input pattern identification data in the same manner as in the first embodiment.

Then, in step S2402, partial feature composition parameters are acquired in the same manner as in the first embodiment. The parameters herein acquired are parameters concerning a process of connecting partial feature vectors in a later step, and parameters concerning a process using input pattern attributes to be acquired in a later step.

Subsequently, attribute information is acquired in step S2403. When the pattern is a person's face, the attribute information herein acquired typically includes, for example, the direction, size, and expression of the face, or the illumination condition of image sensing.

In step S2404, feature vectors to be connected are determined by using the acquired attribute information. In step S2405, the determined feature vectors are connected and output as a final composited partial feature.

An example of the method using the attribute information when determining feature vectors to be connected is a method of predetermining parameters for each attribute of a pattern, and determining feature vectors in accordance with the parameters. For example, a face in profile has only one eye, so feature vectors corresponding to cut positions in unseen portions can be excluded from connection targets.

Since an input pattern and registration pattern sometimes have largely different attributes, it is favorable to form combinations of feature vectors that are hardly affected by changes in attributes. Feature vectors that are hardly affected by changes in attributes can be predetermined by learning. Typically, the following procedure is performed.

That is, in the parameter learning method using AdaBoost in the first embodiment, learning data are classified beforehand in accordance with the attributes, for example, the same face direction and the same expression. Several learning samples are prepared for each face direction, and feature vectors are selected by AdaBoost. If the same feature vector is selected for a plurality of face directions, this feature vector is probably hardly affected by attribute changes. It is also possible to prepare learning data for each attribute, and select a partial feature combination by AdaBoost.

<Composited Partial Feature Evaluation Unit 134>

The composited partial feature evaluation unit 134 will be explained below. The composited partial feature evaluation process performed by the composited partial feature evaluation unit 134 differs from that of the first embodiment in that pattern attribute information is used in the composited partial feature likelihood calculation process and composited partial feature evaluation value calculation process. The differences of these processes from those of the first embodiment will mainly be explained below.

<Composited Partial Feature Likelihood Calculation Process>

A method using pattern attribute information when calculating the likelihood of a composited partial feature will be explained. In the first embodiment, the likelihood of a composited partial feature is calculated by using the statistical amounts of partial features contained in the composited partial feature, more specifically, the variances of parameters such as the position and size. It is presumably possible to improve the reliability of the likelihood itself when combining pattern attribute information with the variances.

As one method of implementing this, an attribute information difference between a registration pattern and input pattern can be used. More specifically, when the pattern is, for example, a person's face and the direction of the face is found as an attribute, a likelihood $\eta$ is defined by $$\eta = \frac{\sigma}{1 + |A_R - A_I|} \quad (10)$$

where $\sigma$ is the likelihood obtained from information other than the pattern attribute information, such as the likelihood obtained by equation (6). $A_R$ represents the face direction angle of a registration pattern, and $A_I$ represents that of an input pattern. When obtaining the likelihood in accordance with equation (10), the likelihood of a composited partial feature can be decreased if the attribute difference between the registration pattern and input pattern is large. The calculation of equation (10) can also be performed by converting a difference between the expressions into a numerical value in addition to the face direction.

Generally, when the conditions (attributes) of a registration pattern and input pattern are largely different, the reliability of corresponding partial features probably decreases. A high propriety can be given to the likelihood by converting the attribute information into numerical values, and decreasing the likelihood if the difference between the numerical values increases.

It is also possible to preobtain the likelihood for each partial feature in accordance with the attribute information, and use the average of these likelihoods as the likelihood of a composited partial feature. In this case, the performance of a partial feature is previously evaluated by learning samples having the same attribute, thereby obtaining the relationship between the attribute information and partial feature likelihood.

<Composited Partial Feature Evaluation Value Calculation Process>

A method using the attribute information of a pattern when calculating the composited partial feature evaluation value will be explained below. In the first embodiment, the evaluation value of one composited partial feature is obtained by the following procedure. That is, the quantity of partial features belonging to the composited partial feature and satisfying a predetermined criterion is measured, and a value obtained by converting the quantity by a predetermined evaluation function, more specifically, an exponential function or polynomial is used as an evaluation value. Furthermore, from the evaluation values of a plurality of composited partial features, the average of evaluation values obtained as described above or the average of evaluation values exceeding a predetermined criterion is output as a final value.

In this embodiment, however, a composited partial feature to be used in the calculation of a final evaluation value is changed in accordance with the attribute information of a pattern. The value of a composited partial feature to be used can be predetermined by learning. Learning samples are classified in accordance with the attributes of patterns, and a composited partial feature effective in determination is selected by using AdaBoost or the like. This makes it possible to obtain the correspondence between the attribute of a pattern and a composited partial feature effective in determination. Instead of selection, it is also possible to obtain weights, and calculate the weighted sum of the evaluation values of composited partial features. In this case, the pattern attribute likelihood acquired from the composited partial feature likelihood calculation unit can be used as the weight.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-253521 filed Nov. 4, 2009 which is hereby incorporated by reference herein in its entirety.

What is claimed is:

1. An image processing apparatus comprising:
an acquisition unit that acquires partial features of an input pattern and partial features of each of registered patterns;
a composition unit that generates composited partial features of the input pattern by combining a plurality of the partial features of the input pattern, and that generates, for each of the registered patterns, composited partial features of the registered pattern by combining a plurality of partial features of the registered pattern corresponding to the partial features in the composited partial features of the input pattern;
a similarity calculation unit that calculates, for each of the registered patterns, a similarity between each partial feature in the composited partial features of the input pattern and a corresponding partial feature in the composited partial features of the registered pattern;
a counting unit that counts, for each of the registered patterns, a number of partial features included in the composited partial features of the registered pattern for which the calculated similarity is higher than a threshold;
a variance calculation unit that calculates a variance for the composited partial features of the input pattern based on a variance of spatial positions and/or spatial sizes of the partial features in the input pattern;
an evaluation unit that evaluates each of the registered patterns based on the variance for the composited partial features of the input pattern and the counted number of partial features for which the similarity is higher than the threshold; and
an identification unit that identifies, among classes to which respective registered patterns belong, a class corresponding to the input pattern based on an evaluation result from said evaluation unit,
wherein the variance of spatial positions is a function of a difference between the spatial position of a partial feature and an average spatial position, and the variance of spatial sizes is a function of a difference between the spatial size of a partial feature and an average spatial size, and
wherein said acquisition unit, said composition unit, said similarity calculation unit, said counting unit, said variance calculation unit, said evaluation unit, and said identification unit are implemented using a processor and memory.

2. The apparatus according to claim 1, further comprising an estimation unit which estimates attributes of the input pattern and the registered patterns,
wherein at least one of said acquisition unit, said composition unit, and said evaluation unit performs processing by using the attributes estimated by said estimation unit.

3. The apparatus according to claim 2, wherein each of the input pattern and the registered patterns is an object in an image, and
wherein the attributes to be estimated by said estimation unit include at least one of a size, a direction, and an illumination condition of the object.

4. The apparatus according to claim 3, wherein the object is a person's face, and
wherein the attributes to be estimated by said estimation unit include at least one of a sex, an age, and an expression of the person.

5. The apparatus according to claim 3, wherein the object is a person's face,
wherein the attributes to be estimated by said estimation unit include face organ position information of the person, and
wherein said acquisition unit acquires the partial feature based on the face organ position information.

6. The apparatus according to claim 3, wherein said estimation unit estimates an attribute of the object by using a camera parameter used when sensing an image of the object.

7. The apparatus according to claim 6, wherein the camera parameter is a parameter pertaining to one of automatic exposure and automatic focusing.

8. The apparatus according to claim 1, wherein said composition unit generates a plurality of composited partial features based on at least one of a spatial position and a spatial size of a partial feature.

9. The apparatus according to claim 1, wherein said identification unit identifies a class to which the input pattern belongs, by using a method of identifying a class of a feature representing a difference between patterns belonging to different classes, and a class of a feature representing a difference produced by variations of patterns belonging to the same class.

10. The apparatus according to claim 1, wherein said composition unit generates a plurality of composited partial features by using a parameter concerning a method of combining the partial features, and
wherein the parameter concerning the method of combining the partial features is determined by generating a learning sample belonging to a class of a feature representing a difference between objects belonging to different classes, and a learning sample belonging to a class representing a difference produced by variations of objects belonging to the same class from prepared image samples, and selecting a prepared partial feature combination with respect to the learning samples by machine learning.

11. The apparatus according to claim 10, wherein the learning is performed by AdaBoost.

12. An image processing method comprising:
- an acquisition step of acquiring partial features of an input pattern and partial features of each of registered patterns;
- a composition step of generating composited partial features of the input pattern by combining a plurality of the partial features of the input pattern, and of generating, for each of the registered patterns, composited partial features of the registered pattern by combining a plurality of partial features of the registered pattern corresponding to the partial features in the composited partial features of the input pattern;
- a similarity calculation step of calculating, for each of the registered patterns, a similarity between each partial feature in the composited partial features of the input pattern and a corresponding partial feature in the composited partial features of the registered pattern;
- a counting step of counting, for each of the registered patterns, a number of partial features included in the composited partial features of the registered pattern for which the calculated similarity is higher than a threshold;
- a variance calculation step of calculating a variance for the composited partial features of the input pattern based on a variance of spatial positions and/or spatial sizes of the partial features in the input pattern;
- an evaluation step of evaluating each of the registered patterns based on the variance for the composited partial features of the input pattern and the counted number of partial features for which the similarity is higher than the threshold; and
- an identification step of identifying, among classes to which respective registered patterns belong, a class corresponding to the input pattern based on an evaluation result from the evaluation step,
- wherein the variance of spatial positions is a function of a difference between the spatial position of a partial feature and an average spatial position, and the variance of spatial sizes is a function of a difference between the spatial size of a partial feature and an average spatial size.

13. A non-transitory computer-readable storage medium storing a computer program which causes a computer to function as each unit of an image processing apparatus according to claim 1.

* * * * *